US008441979B2

(12) United States Patent
Imaeda et al.

(10) Patent No.: US 8,441,979 B2
(45) Date of Patent: May 14, 2013

(54) CONTROL APPARATUS TO DIVIDE OTHER COMMUNICATION APPARATUSES INTO MULTIPLE GROUPS FOR SLOT ALLOCATED COMMUNICATION

(75) Inventors: Eiji Imaeda, Kawasaki (JP); Ichiro Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 11/939,069

(22) Filed: Nov. 13, 2007

(65) Prior Publication Data

US 2008/0212699 A1    Sep. 4, 2008

(30) Foreign Application Priority Data

Nov. 17, 2006 (JP) ................................. 2006-312132

(51) Int. Cl.
*H04B 7/212* (2006.01)
(52) U.S. Cl.
USPC .......................................... 370/321; 370/326
(58) Field of Classification Search ........................ None
See application file for complete search history.

(56) References Cited

U.S. PATENT DOCUMENTS

| 5,121,388 | A | * | 6/1992 | Perdikaris et al. ............. 370/401 |
| 5,263,026 | A | * | 11/1993 | Parr et al. ...................... 370/350 |
| 5,299,199 | A | * | 3/1994 | Wilson et al. ................. 370/347 |
| 5,390,215 | A | * | 2/1995 | Antia et al. .................... 375/341 |
| 5,502,722 | A | * | 3/1996 | Fulghum ........................ 370/343 |
| 5,528,622 | A | * | 6/1996 | Cadd et al. .................... 370/447 |
| 5,818,820 | A | * | 10/1998 | Anderson et al. ............. 370/280 |
| 5,859,879 | A | * | 1/1999 | Bolgiano et al. .............. 370/330 |
| 5,907,540 | A |   | 5/1999 | Hayashi |
| 5,959,981 | A | * | 9/1999 | Bruckert et al. .............. 370/331 |
| 6,345,075 | B1 | * | 2/2002 | Fuhl et al. ...................... 375/341 |
| 6,437,743 | B1 | * | 8/2002 | Mintz et al. ................... 342/463 |
| 6,535,503 | B1 | * | 3/2003 | Toskala et al. ................ 370/349 |
| 6,590,860 | B1 | * | 7/2003 | Sakoda et al. ................ 370/203 |
| 7,194,262 | B2 |   | 3/2007 | Aoki et al. |
| 7,194,270 | B2 | * | 3/2007 | Smith ........................... 455/446 |
| 7,224,954 | B2 |   | 5/2007 | Okajima et al. |
| 7,277,472 | B2 | * | 10/2007 | Li et al. ......................... 375/148 |

(Continued)

FOREIGN PATENT DOCUMENTS

EP          0979017 A1    2/2000
GB          2399991 A     9/2004

(Continued)

OTHER PUBLICATIONS

Japanese Office Action for Appln. No. 2006-312132 dated Nov. 18, 2011, Non-English document.

(Continued)

*Primary Examiner* — Marsha D Banks Harold
*Assistant Examiner* — Hooman Houshmand
(74) *Attorney, Agent, or Firm* — Carter, DeLuca, Farrell & Schmidt LLP

(57) ABSTRACT

A communication control apparatus that performs wireless communication with a plurality of communication apparatuses, the communication control apparatus comprises: a grouping unit adapted to group the plurality of communication apparatuses based on the relative positions of each of the plurality of communication apparatuses; a notification unit adapted to notify each of the plurality of communication apparatuses of the group to which that communication apparatus belongs and of a communication slot allocated to that group; and a transmission unit adapted to transmit transmission data at a predetermined timing.

6 Claims, 22 Drawing Sheets

U.S. PATENT DOCUMENTS

| | | | |
|---|---|---|---|
| 2002/0082767 A1* | 6/2002 | Mintz | 701/117 |
| 2003/0002490 A1* | 1/2003 | Wong et al. | 370/355 |
| 2003/0058826 A1* | 3/2003 | Shearer, III | 370/338 |
| 2003/0169697 A1* | 9/2003 | Suzuki et al. | 370/310 |
| 2004/0128091 A1* | 7/2004 | Delin et al. | 702/75 |
| 2004/0218577 A1* | 11/2004 | Nguyen et al. | 370/347 |
| 2005/0243943 A1* | 11/2005 | Stirling-Gallacher | 375/267 |
| 2007/0070954 A1* | 3/2007 | Kim et al. | 370/334 |

FOREIGN PATENT DOCUMENTS

| | | |
|---|---|---|
| JP | 07-250018 A | 9/1995 |
| JP | 08-097821 | 4/1996 |
| JP | 08-107377 A | 4/1996 |
| JP | 11-122150 | 4/1999 |
| JP | 2001-189971 | 7/2001 |
| JP | 2003-332977 | 11/2003 |
| KR | 10-2006-0064485 A | 6/2006 |
| WO | 2005/125127 A | 12/2005 |

OTHER PUBLICATIONS

European Search Report for Counterpart European Application No. 07020882.2, dated Oct. 31, 2012.

* cited by examiner

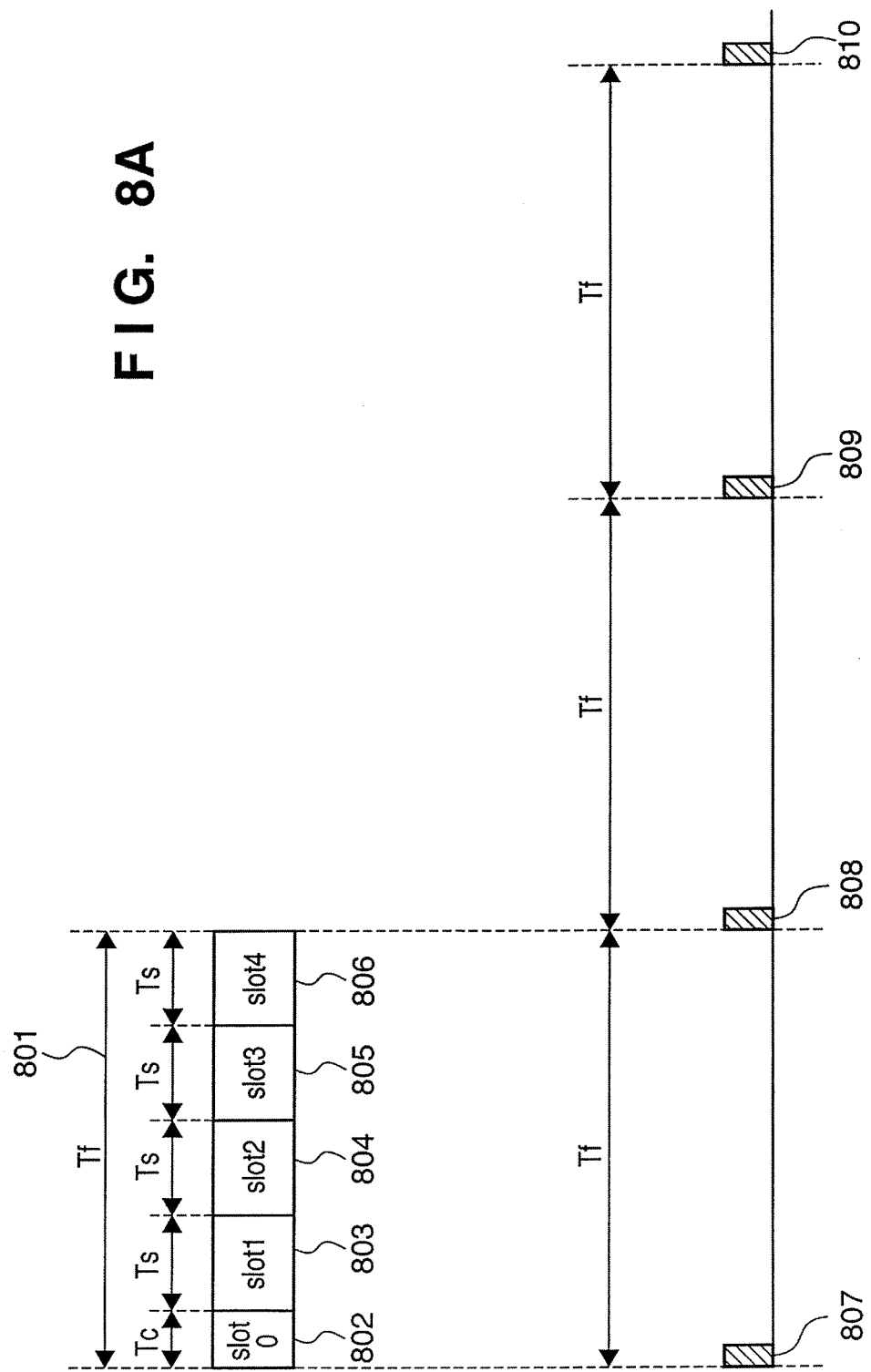

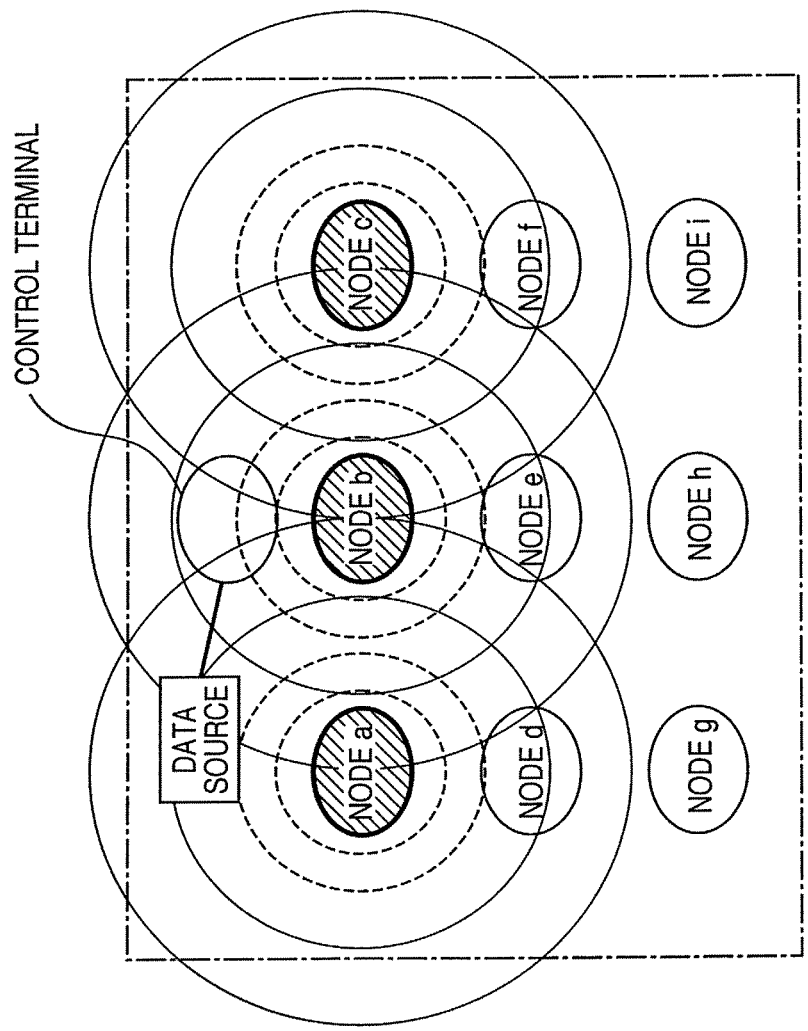
F I G. 10B

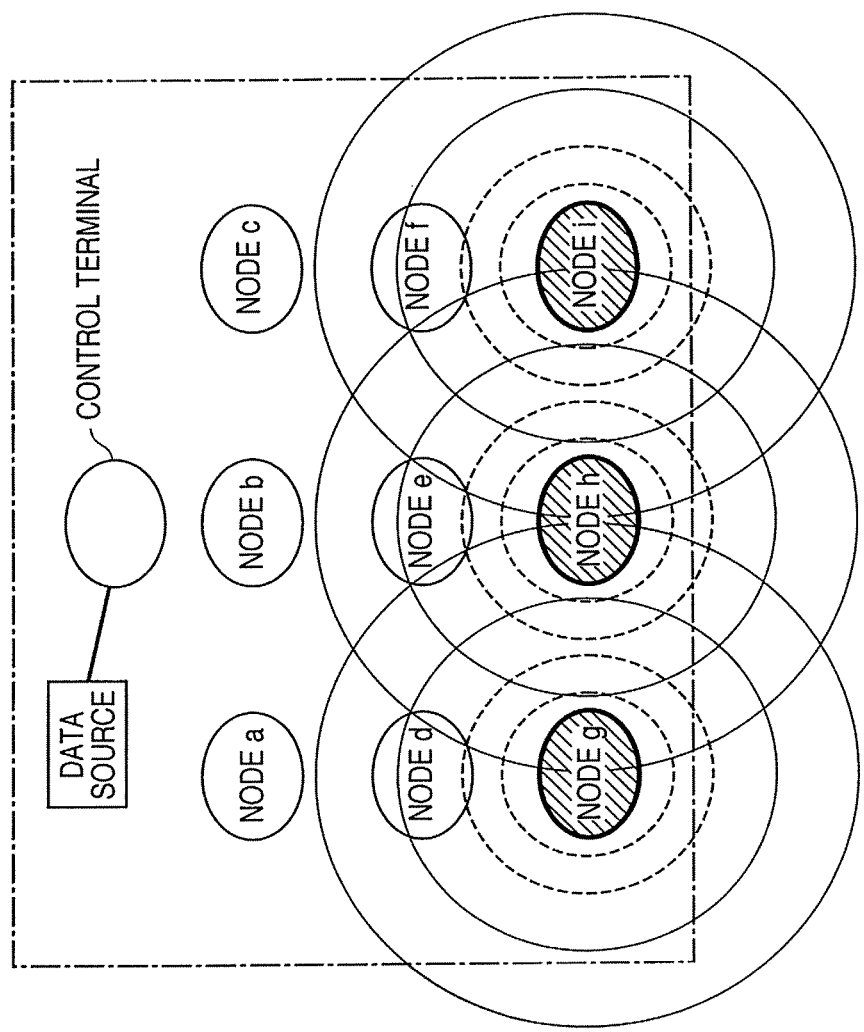
F I G. 10D

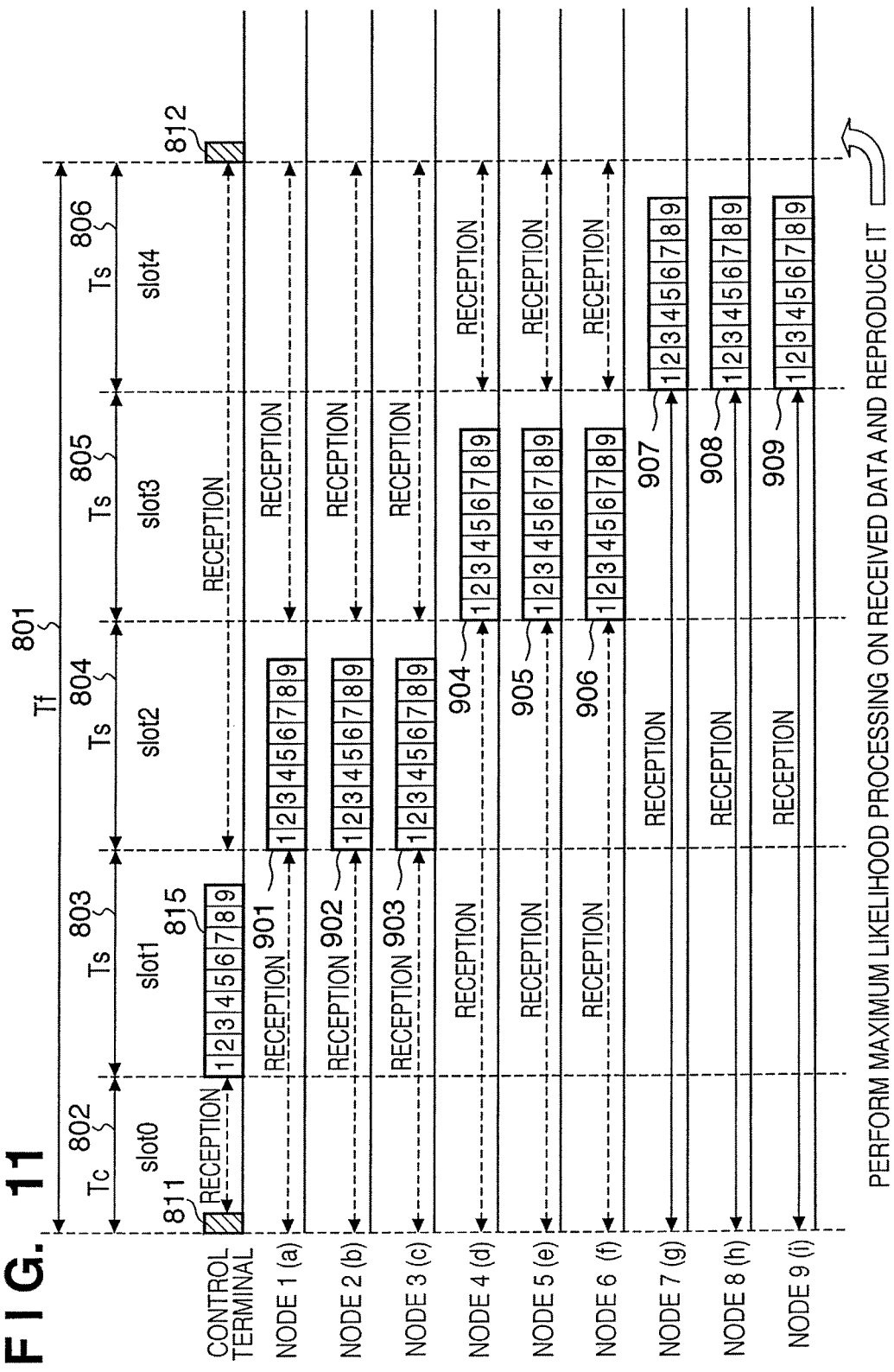

F I G. 13
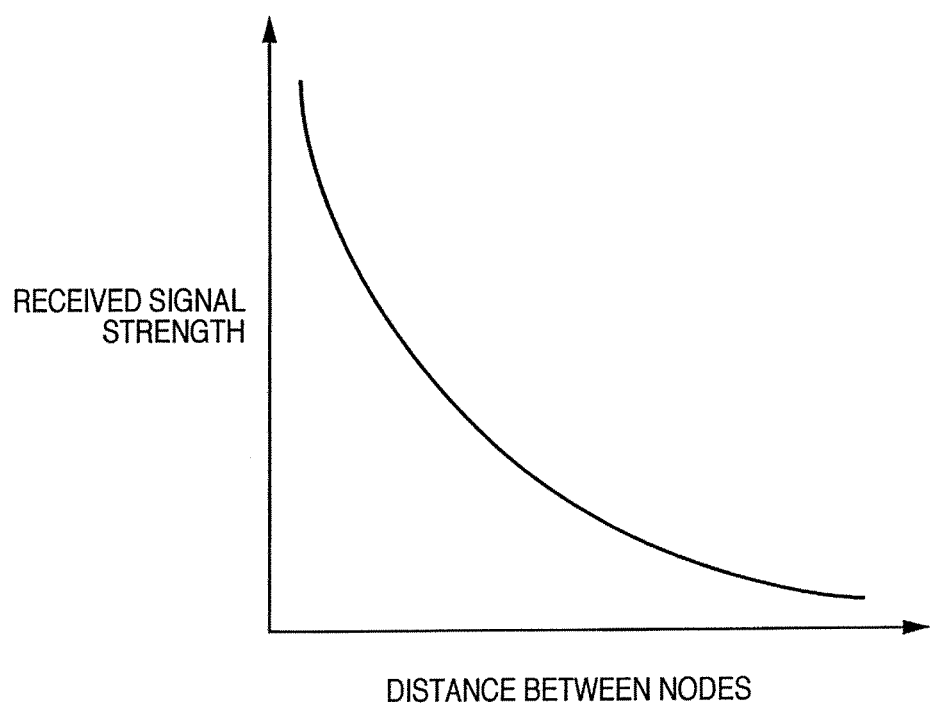

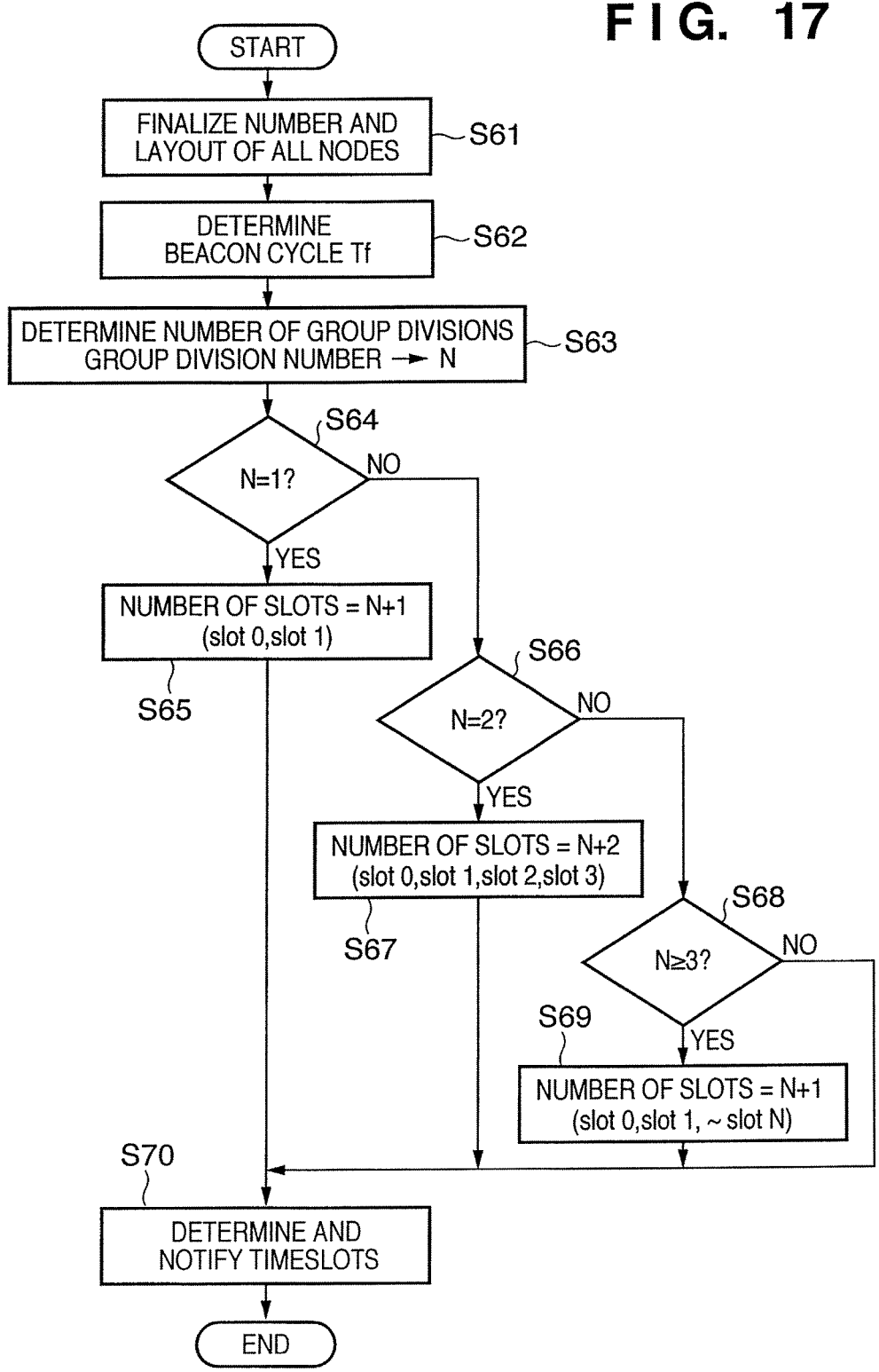
F I G. 17

CONTROL APPARATUS TO DIVIDE OTHER COMMUNICATION APPARATUSES INTO MULTIPLE GROUPS FOR SLOT ALLOCATED COMMUNICATION

BACKGROUND OF THE INVENTION

1. Field of the Invention

The present invention relates to a communication control apparatus and a control method thereof, a communication apparatus and a control method thereof, a wireless communication system, a program, and a storage medium.

2. Description of the Related Art

Technology that aims to configure plural connection links through relay transmission and carry out wireless transmission with a remote communication terminal is known (Japanese Patent Laid-Open No. H8-97821; Japanese Patent Laid-Open No. 2001-189971). Specifically, a wireless communication system is known in which address information, relay information, and the like are added to communication data and transmitted to multiple addresses, and relay terminals relay the data in accordance with the address information, relay information, and the like.

Furthermore, a wireless communication scheme that aims to expand the communication range of a receiving terminal through plural senders transmitting identical data is known (Japanese Patent Laid-Open No. H11-122150). Specifically, a scheme is known in which plural transmission signals, to which have been added respectively differing amounts of delay, are transmitted from plural transmission terminals; on the receiving side, the received signal unaffected by interference is selected, equalization processing is performed thereon, and the original data is thereby estimated.

Furthermore, as technology for efficiently transmitting data wirelessly to a remote communication terminal, a scheme is known in which a relay terminal having a good condition of communication is selected and data is distributed to peripheral communication terminals by way of that relay terminal, thereby realizing efficient data transfer (Japanese Patent Laid-Open No. 2003-332977).

However, in recent years, where data communication functionality has become widespread, demand has increased for what is known as "real-time" communications, in which video data, audio data, and the like is transmitted from a data storage device through a communication line and is received and reproduced by a video display device, an audio reproduction device, or the like.

Schemes such as the abovementioned conventional schemes respond to the occurrence of disconnections and interruptions in the communication path caused by some kind of problem in the communication path by performing retransmission, changing paths, and so on. However, the retransmission processing, processing for changing paths, and so on are performed asynchronously, and thus transmission delay cannot be guaranteed. For this reason, when stream data that is temporally continuous, such as video or audio, is transmitted and continuously reproduced on the receiving side, and disconnections or interruptions occur in the communication path, there are situations where data underruns occur on the receiving side. Therefore, there is a problem that the reproduced video is unstable, the reproduced audio cuts out intermittently, and so on.

In the abovementioned conventional schemes, by using plural paths, reception can be carried out properly even if disconnections or interruptions occur in a single path. However, these processes assume predetermined plural transmission terminals and a single receiving terminal, and does nothing more than implement the connection of plural paths by eliminating signal interference from the plural transmission terminals. For this reason, when performing data transfers in unison to plural receiving terminals, such as with multi-channel stream data, mutual interference arises when data is transmitted to the respective receiving terminals over plural paths.

SUMMARY OF THE INVENTION

Having been conceived in light of the aforementioned problems, it is an object of the present invention to provide a technique for reducing the occurrence of disconnections and interruptions when transmitting data such as stream data that is temporally continuous, such as video or audio. It is furthermore an object of the present invention to provide a technique for avoiding mutual interference even when simultaneously sending plural pieces of data to plural receiving terminals.

According to one aspect of the present invention, a communication control apparatus that performs wireless communication with a plurality of communication apparatuses, the communication control apparatus comprises:

a grouping unit adapted to group the plurality of communication apparatuses based on the relative positions of each of the plurality of communication apparatuses;

a notification unit adapted to notify each of the plurality of communication apparatuses of the group to which that communication apparatus belongs and of a communication slot allocated to that group; and a transmission unit adapted to transmit transmission data at a predetermined timing.

According to another aspect of the present invention, a communication apparatus that performs wireless communication in a wireless communication system that includes a plurality of communication apparatuses and a communication control apparatus, the communication apparatus comprises:

a notification receiving unit adapted to receive, from the communication control apparatus, a notification of the group to which the communication apparatus belongs and a communication slot allocated to that group;

a data receiving unit adapted to receive transmission data from an external apparatus and store the received data in a storage device;

a maximum likelihood processing unit adapted to perform maximum likelihood processing on the transmission data stored in the storage device; and a transmission unit adapted to transmit the transmission data on which the maximum likelihood processing has been performed using the communication slot allocated to the group to which the communication apparatus belongs.

According to still another aspect of the present invention, a wireless communication system comprising a plurality of communication apparatuses and a communication control apparatus, wherein the communication control apparatus includes:

a grouping unit adapted to group the plurality of communication apparatuses based on the relative positions of each of the plurality of communication apparatuses;

a notification unit adapted to notify each of the plurality of communication apparatuses of the group to which that communication apparatus belongs and of a communication slot allocated to that group; and a transmission unit adapted to transmit transmission data at a predetermined timing, and each of the communication apparatuses includes:

a notification receiving unit adapted to receive, from the communication control apparatus, a notification of the group to which the communication apparatus belongs and a communication slot allocated to that group;

a data receiving unit adapted to receive the transmission data from an external apparatus and store the received data in a storage device;

a maximum likelihood processing unit adapted to perform maximum likelihood processing on the transmission data stored in the storage device; and a transmission unit adapted to transmit the transmission data on which the maximum likelihood processing has been performed using the communication slot allocated to the group to which the communication apparatus belongs.

According to yet another aspect of the present invention, a control method for a communication control apparatus that performs wireless communication with a plurality of communication apparatuses, the method comprises:

grouping the plurality of communication apparatuses based on the relative positions of each of the plurality of communication apparatuses;

notifying each of the plurality of communication apparatuses of the group to which that communication apparatus belongs and of a communication slot allocated to that group; and transmitting transmission data at a predetermined timing.

According to still yet another aspect of the present invention, a control method for a communication apparatus that performs wireless communication in a wireless communication system that includes a plurality of communication apparatuses and a communication control apparatus, the method comprises:

receiving, from the communication control apparatus, a notification of the group to which the communication apparatus belongs and a communication slot allocated to that group;

receiving transmission data from an external apparatus and storing the received data in a storage device;

performing maximum likelihood processing on the transmission data stored in the storage device; and transmitting the transmission data on which the maximum likelihood processing has been performed using the communication slot allocated to the group to which the communication apparatus belongs.

Further features of the present invention will become apparent from the following description of exemplary embodiments (with reference to the attached drawings).

BRIEF DESCRIPTION OF THE DRAWINGS

FIGS. 8A and 8B are time slot diagrams illustrating operations of a control terminal.

FIGS. 10A, 10B, 10C, and 10D are diagrams conceptually illustrating the change over time of the transmission of stream data by the control terminal and nodes.

FIG. 11 is a diagram illustrating transmission of stream data by the control terminal and nodes on the time axis.

FIG. 13 is a diagram schematically illustrating a relationship between the strength of a received training signal and the distance between nodes.

FIG. 17 is a flowchart illustrating a procedure for processing performed by the control terminal to determine groups and time slots.

DESCRIPTION OF THE EMBODIMENTS

Hereinafter, embodiments of the present invention shall be described in detail with reference to the appended drawings. Note that the constituent elements denoted in the following embodiments are only examples, and the scope of the present invention is not intended to be limited thereto.

Embodiment 1

(Network Configuration)

Figure 1:
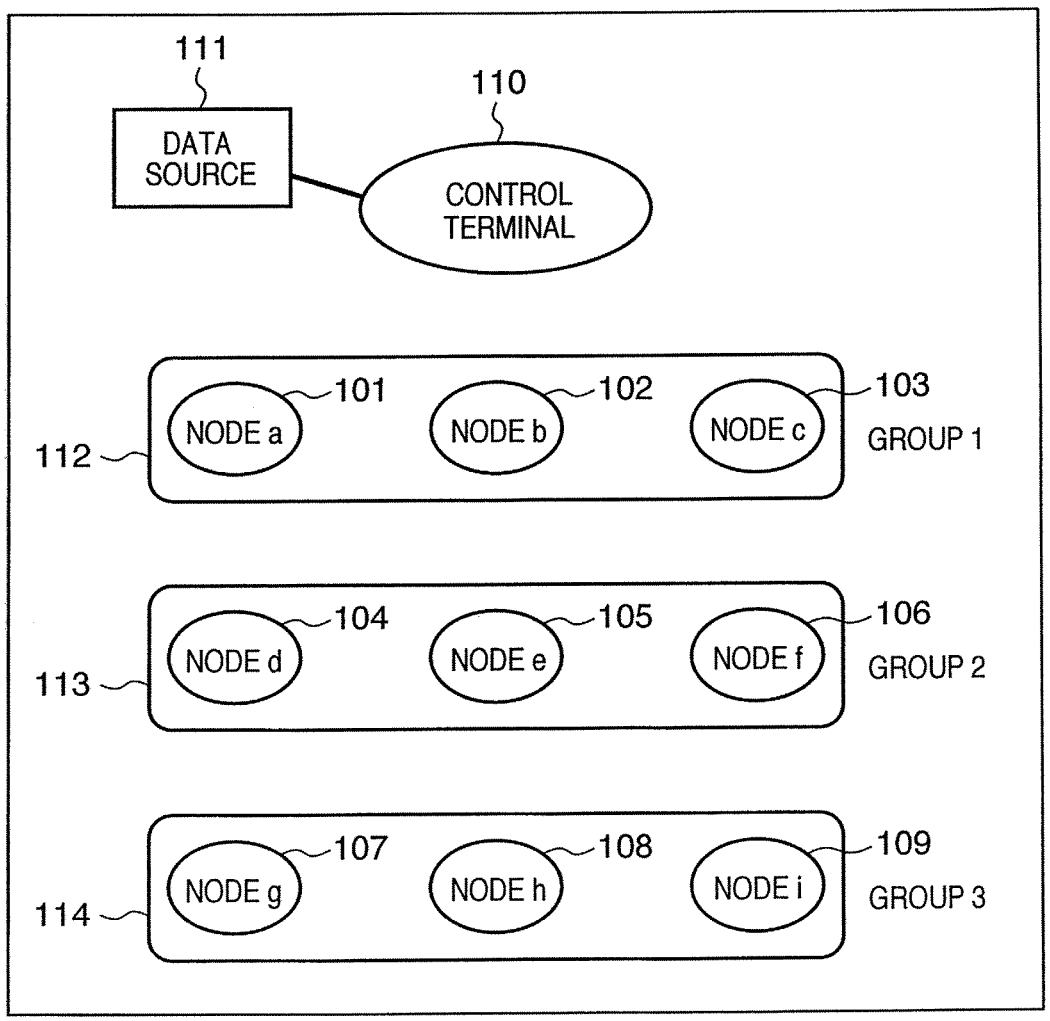
FIG. 1 is a diagram illustrating an example of a configuration of a network that includes a wireless communication apparatus.

FIG. 1 is a diagram illustrating an example of a configuration of a network that includes a wireless communication apparatus according to the present embodiment. In FIG. 1, 101-109 are nodes (communication apparatuses) a through i, which are the wireless communication apparatuses according to the present embodiment; 110 is a control terminal (communication control apparatus), which is a wireless communication apparatus; and 111 is a data source that outputs AV (audio-visual) data. 112 is a group 1, made up of nodes a to c; 113 is a group 2, made up of nodes d to f; and 114 is a group 3, made up of nodes g to i.

The data source 111 is an apparatus that outputs AV data to be processed in real time. The data source 111 continuously outputs AV data, such as multi-screen video data, multi-channel audio data, and so on.

The control terminal 110 mutually exchanges control signals, control data, and the like wirelessly with the nodes a 101 to i 109. Furthermore, the control terminal 110 converts AV data from the data source 111 into stream data and wirelessly transmits the result.

The nodes a 101 to i 109 mutually communicate control signals, control data, and the like with the control terminal 110 wirelessly. Furthermore, the nodes a 101 to i 109 wirelessly receive stream data from the control terminal 110 and from plural other nodes, and wirelessly transmit the received stream data.

Group 1 (112) to group 3 (114) are groups configured of plural nodes. Group allocation is determined by the control terminal 110, and each node is notified thereof by the control data. As shall be explained later, nodes within the same group each transmit stream data wirelessly at the same timing.

(Control Terminal)

Figure 2:
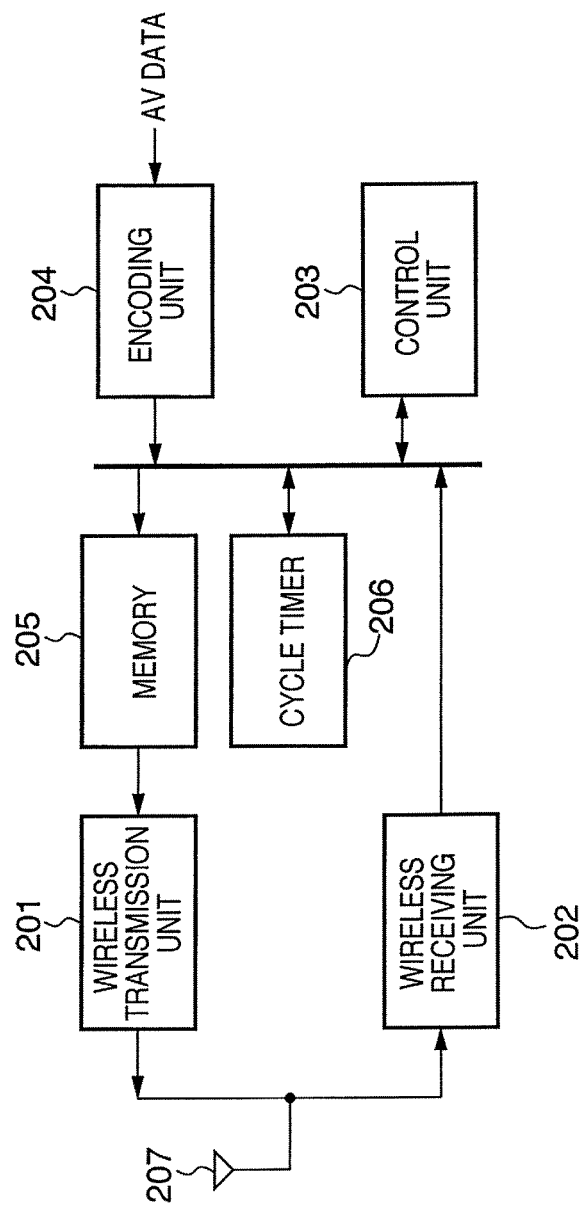
FIG. 2 is a block diagram illustrating an internal configuration of a control terminal.

FIG. 2 is a block diagram illustrating an internal configuration of the control terminal 110. In FIG. 2, 201 is a wireless transmission unit, 202 is a wireless receiving unit, 203 is a control unit that controls the overall operations of the control terminal 110, 204 is an encoding unit, 205 is a memory, 206 is a cycle timer, and 207 is an antenna.

The control unit 203 sends control data to the wireless transmission unit 201 via the memory 205, and controls the wireless transmission unit 201 to modulate the control data into a wireless signal and wirelessly transmit the resultant from the antenna 207. Additionally, AV data from the data source 111 is converted into stream data by the encoding unit 204 and is temporarily stored in the memory 205. Then, in accordance with instructions from the control unit 203, and in synchronization with the cycle timer 206, the control terminal 110 converts the stream data into frames, the units of transmission data, and the resultants are sent from the memory 205 to the wireless transmission unit 201. After this, in accordance with instructions from the control unit 203, and in synchronization with the cycle timer 206, the wireless transmission unit 201 modulates the data from the memory 205 into a wireless signal, and wirelessly transmits the resultant from the antenna 207.

In accordance with instructions from the control unit 203, the wireless receiving unit 202 receives the wireless signal from the antenna 207, demodulates the wireless signal into received data, and sends the received data to the control unit 203. In addition to performing overall control, the control unit 203 writes a synchronization signal, for controlling the synchronization of wireless communication with other nodes, into the memory 205, and performs control so that the synchronization signal is transmitted from the wireless transmission unit 201 at a prescribed timing. Furthermore, the control unit 203 converts the transmission data into frames in accordance with terminal information communicated from other nodes as control data.

Detailed descriptions of the wireless transmission unit 201 and the wireless receiving unit 202 shall be provided later. In the present embodiment, the wireless transmission unit 201 of the control terminal 110 includes a DSSS type modulation unit and an OFDM type modulation unit. These two techniques utilize techniques compliant with IEEE 802.11 and IEEE 802.11a, as standardized by the IEEE, and thus detailed descriptions thereof shall be omitted. Note that "DSSS" is an abbreviation of "Direct Sequence Spread Spectrum", whereas "OFDM" is an abbreviation of "Orthogonal Frequency Division Multiplexing". "IEEE" is an abbreviation of "Institute of Electrical and Electronics Engineers".

In addition, the wireless receiving unit 202 of the control terminal 110 includes a DSSS type demodulation unit. The OFDM type modulation unit is used when stream data stored in the memory 205 is transmitted from the encoding unit 204. When transmitting and receiving other data, the DSSS type modulation unit and demodulation unit are used.

(Nodes)

Figure 3:
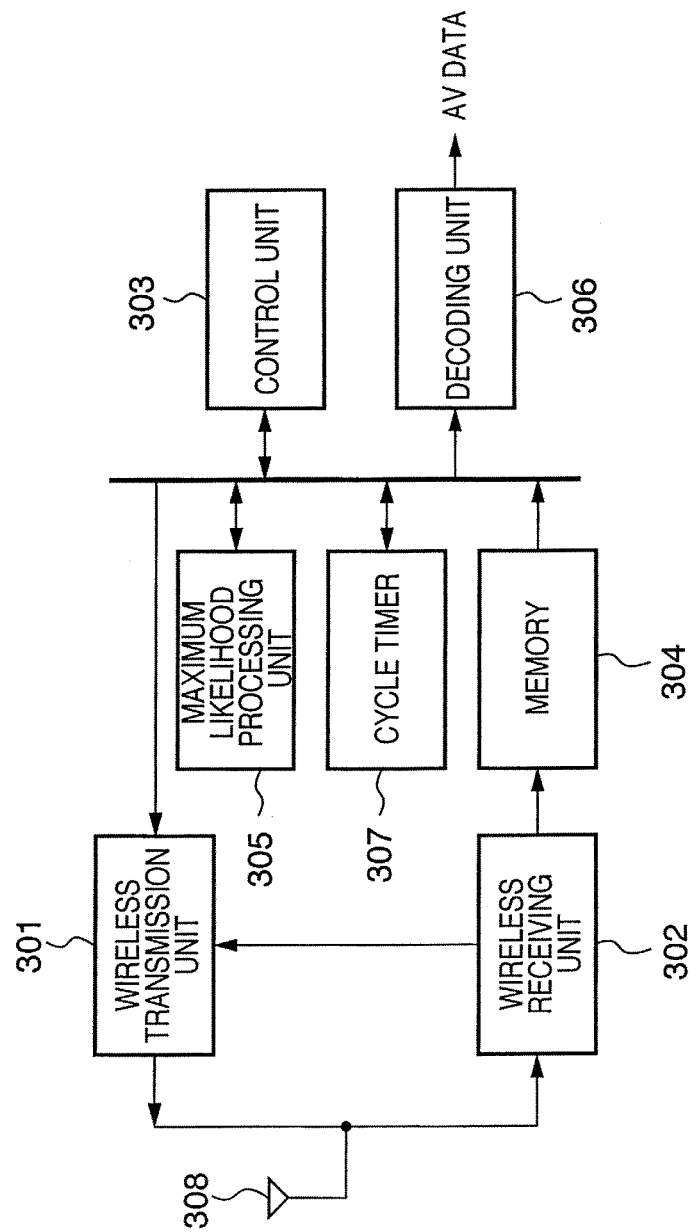
FIG. 3 is a block diagram illustrating an internal configuration of a node.

FIG. 3 is a block diagram illustrating an internal configuration of the node a 101. Nodes b 102 to i 109 have the same configuration. In other words, although the node a 101 shall be described hereinafter, these descriptions also apply to the nodes b 102 to i 109. In FIG. 3, 301 is a wireless transmission unit, 302 is a wireless receiving unit, 303 is a control unit that controls the operations of the node, 304 is a memory, 305 is a maximum likelihood processing unit, 306 is a decoding unit, 307 is a cycle timer, and 308 is an antenna.

The wireless receiving unit 302 transmits, to the wireless transmission unit 301, a synchronization signal notifying the symbol synchronization timing of the received data. Additionally, in accordance with instructions from the control unit 303, and in synchronization with the cycle timer 307, the wireless receiving unit 302 stores the received data in the memory 304.

The control unit 303 selects the data addressed to its own node from among the received data stored in the memory 304, and sends this data to the decoding unit 306 via the maximum likelihood processing unit 305. The maximum likelihood processing unit 305 estimates the most likely data from among plural pieces of input data, and generates output data. The decoding unit 306 receives the most likely data from the maximum likelihood processing unit 305, decodes the received data, and outputs AV data. The AV data output from the decoding unit 306 is used in processing such as video reproduction and display, audio reproduction, or the like.

Furthermore, the control unit 303 passes plural pieces of received data stored in the memory 304 to the wireless transmission unit 301 via the maximum likelihood processing unit 305; this received data is wirelessly transmitted from the wireless transmission unit 301 in synchronization with the cycle timer 307. Further still, the control unit 303 passes terminal information of its own node to the wireless transmission unit 301 as control data to be communicated to the control terminal 110; this terminal information is wirelessly transmitted to the control terminal 110. The terminal information is an individual ID (identifier) value set in advance for identification of the own node, capability information of the decoding unit 306, capability information of the wireless receiving unit 302 and wireless transmission unit 301, or the like.

The wireless transmission unit 301 and the wireless receiving unit 302 of the node a 101 include DSSS type and OFDM type modulation units and demodulation units. In the present embodiment, these two techniques utilize techniques compliant with IEEE 802.11 and IEEE 802.11a, and thus detailed descriptions thereof shall be omitted. The node a 101 communicates using the OFDM type modulation unit when transmitting stream data and using the DSSS type modulation unit when transmitting other control data. In addition, the node a 101 communicates using the OFDM type demodulation unit when receiving stream data and using the DSSS type demodulation unit when receiving other control data, control signals, and so on. Detailed descriptions of the wireless transmission unit 301 and the wireless receiving unit 302 shall be provided later.

(DSSS and OFDM Techniques)

Next, explanations shall be provided regarding the characteristic differences between the DSSS and OFDM techniques utilized in the present embodiment.

The DSSS technique utilized by the control terminal 110 and the nodes a 101 to i 109 is a modulation technique that directly spreads data with spread code using the Differential Binary Phase Shift Keying (DBPSK) modulation technique. This can be implemented by a simple circuit, and thus is a data communication technique capable of low-delay processing. While the transmission rate is a low 1 Mbps, the technique is highly resistant to errors, and can properly transmit data over long distances even in communication environments having poor transmission conditions.

Additionally, the OFDM technique of the present embodiment utilizes an advanced modulation technique called the 64-position Quadrature Amplitude Modulation (64QAM) technique. While this technique has a heavier processing load and higher delay than the stated DSSS technique, it is capable of realizing a high 54 Mbps bitrate. However, the error resistance is low compared to the stated DSSS technique, and the signal transmission range in which information can be properly transmitted is smaller than that of the DSSS technique.

Figure 4:
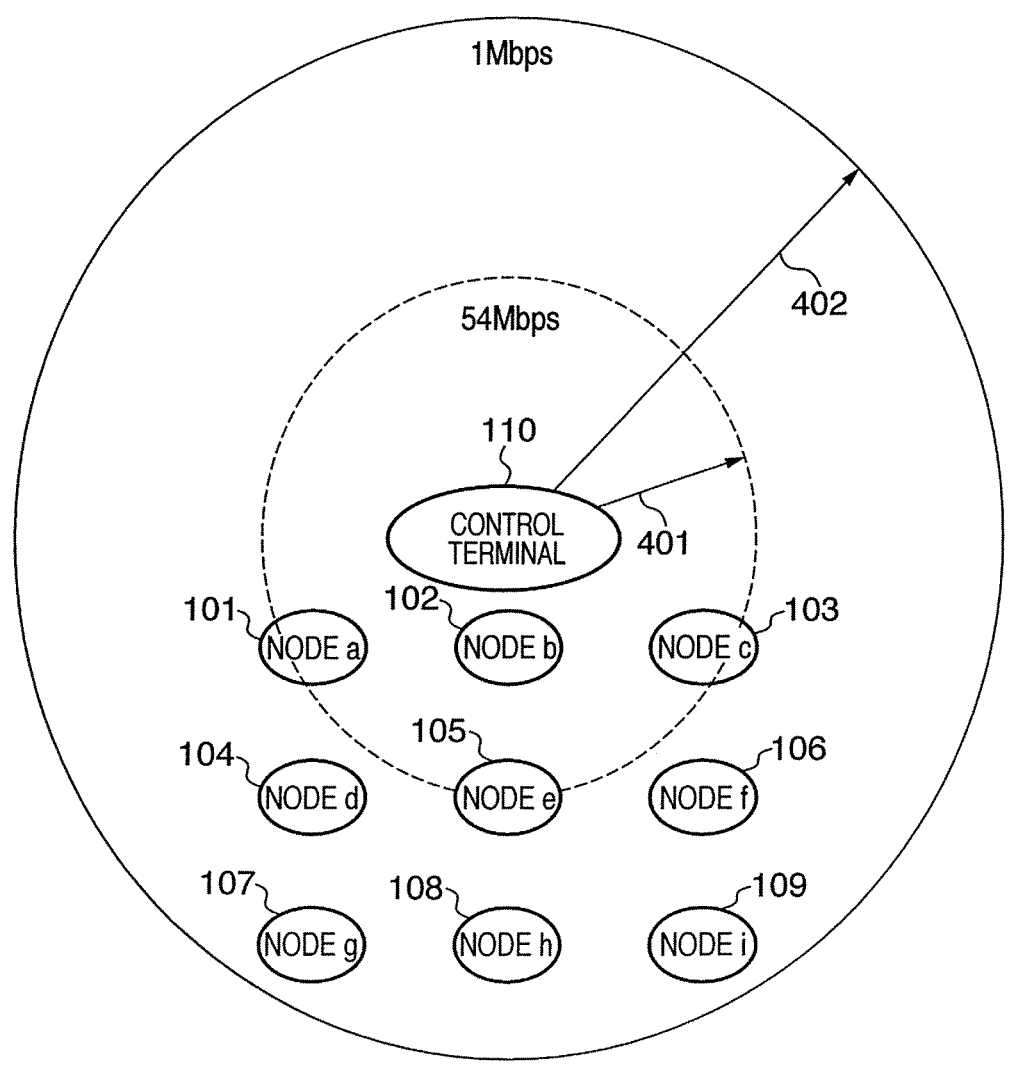
FIG. 4 is a diagram schematically illustrating the difference in the signal transmission range between the DSSS and OFDM techniques.

FIG. 4 is a diagram schematically illustrating the difference in the signal transmission range between the DSSS and OFDM techniques. In FIG. 4, 401 schematically indicates the concept of the distance that data can be properly transmitted using the OFDM technique, while 402 schematically indicates the concept of the distance that data can be properly transmitted using the DSSS technique. In other words, FIG. 4 conceptually illustrates that the control terminal 110 and the nodes a 101 to i 109 are capable of data communication at 1 Mbps using the DSSS technique. Furthermore, FIG. 4 conceptually illustrates that the control terminal 110 and the nodes a 101 to c 103 and e 105 are capable of data communication at 54 Mbps using the OFDM technique.

However, here, nodes outside of the transmission range 401 are also capable of data communication using the OFDM technique if errors of a certain degree can be overcome. The probability of an error occurring generally increases as the transmission distance increases. Forward Error Correction (FEC) code is added to the transmitted data frames for error correction on the receiving side. Therefore, due to error correction, it is possible to estimate the original data if the transmission conditions are favorable and the degree of the error is small, even if the node is outside of the transmission range 401; thus correct data reception is possible with communication using the OFDM technique.

Although the above descriptions discuss the case of the control terminal 110 transmitting data, the same applies in the case where any of the nodes a 101 to 109 transmit data using the OFDM technique. In other words, 54 Mbps communication using the OFDM technique is possible between nearby nodes, and 1 Mbps communication using the DSSS technique is possible between faraway nodes, the control terminal, and so on.

(Wireless Transmission Unit/Wireless Receiving Unit of the Control Terminal)

Figure 5:
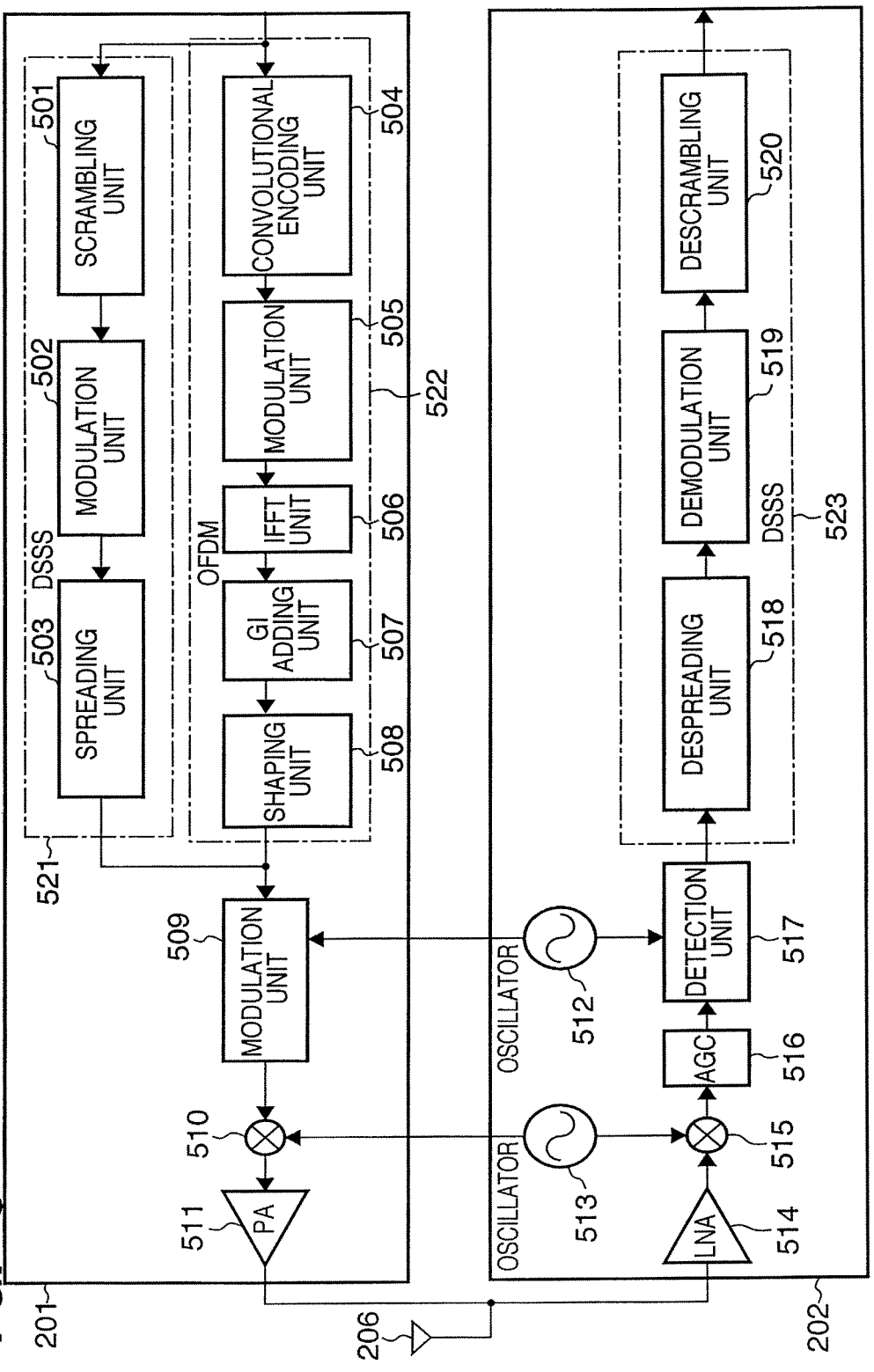
FIG. 5 is a diagram illustrating a detailed configuration of a wireless transmission unit and a wireless receiving unit of a control terminal.

Next, the wireless transmission unit 201 and wireless receiving unit 202 of the control terminal 110 shall be described with reference to FIG. 5. FIG. 5 is a diagram illustrating a detailed configuration of the wireless transmission unit 201 and wireless receiving unit 202 of the control terminal 110.

501 is a scrambling unit for randomizing a bit string and reducing its correlation with an unrelated bit string; 502 is a modulation unit that performs DBPSK modulation; and 503 is a spreading unit that performs spectrum spreading using spread code. A DSSS type modulation unit 521 is configured of the scrambling unit 501, modulation unit 502, and spreading unit 503.

504 is a convolutional encoding unit that performs redundant encoding for error correction processing. 505 is a modulation unit that divides input data among 48 subcarriers and performs 64 Quadrature Amplitude Modulation (QAM). 506 is an Inverse Fast Fourier Transform (IFFT) unit that performs an inverse Fast Fourier Transform on each modulated subcarrier signal. 507 is a Guard Interval (GI) adding unit that adds a guard interval for canceling the influence of delay interference waves. 508 is a shaping unit that performs waveform shaping in order to reduce out-of-band power. An OFDM type modulation unit 522 is configured of the convolutional encoding unit 504, modulation unit 505, IFFT unit 506, GI adding unit 507, and shaping unit 508.

509 is a modulation unit that performs orthogonal modulation at an intermediate frequency. 510 is a multiplier that converts a signal input from the modulation unit 509 into a wireless carrier frequency. 511 is a power amplifier (PA) that amplifies the wireless transmission power.

Only one of the DSSS type modulation unit 521 and the OFDM type modulation unit 522 operates. In other words, the transmitted data is processed by either the scrambling unit 501 or the convolutional encoding unit 504. The processed data is then output from either the spreading unit 503 or the shaping unit 508, and input into the modulation unit 509.

512 is an oscillator that generates an intermediate frequency, whereas 513 is an oscillator that generates a wireless carrier frequency. 514 is a low noise amplifier (LNA) that amplifies a received signal. 515 is a multiplier that extracts a signal tuned by the wireless carrier frequency. 516 is an automatic gain control (AGC) that automatically adjusts the signal strength to a predetermined amplitude strength. 517 is a detection unit that converts the frequency of the signal to an intermediate frequency and performs quadrature detection.

518 is a despreading unit that multiplies the spread signal by spread code and produces the original signal. 519 is a demodulation unit that generates the original data from the DBPSK-modulated signal. 520 is a descrambling processing unit that returns the scrambled data to its original state. The DSSS type demodulation unit 523 is configured of the despreading unit 518, the demodulation unit 519, and the descrambling processing unit 520.

(Wireless Transmission Unit/Wireless Receiving Unit of the Nodes)

Figure 6:
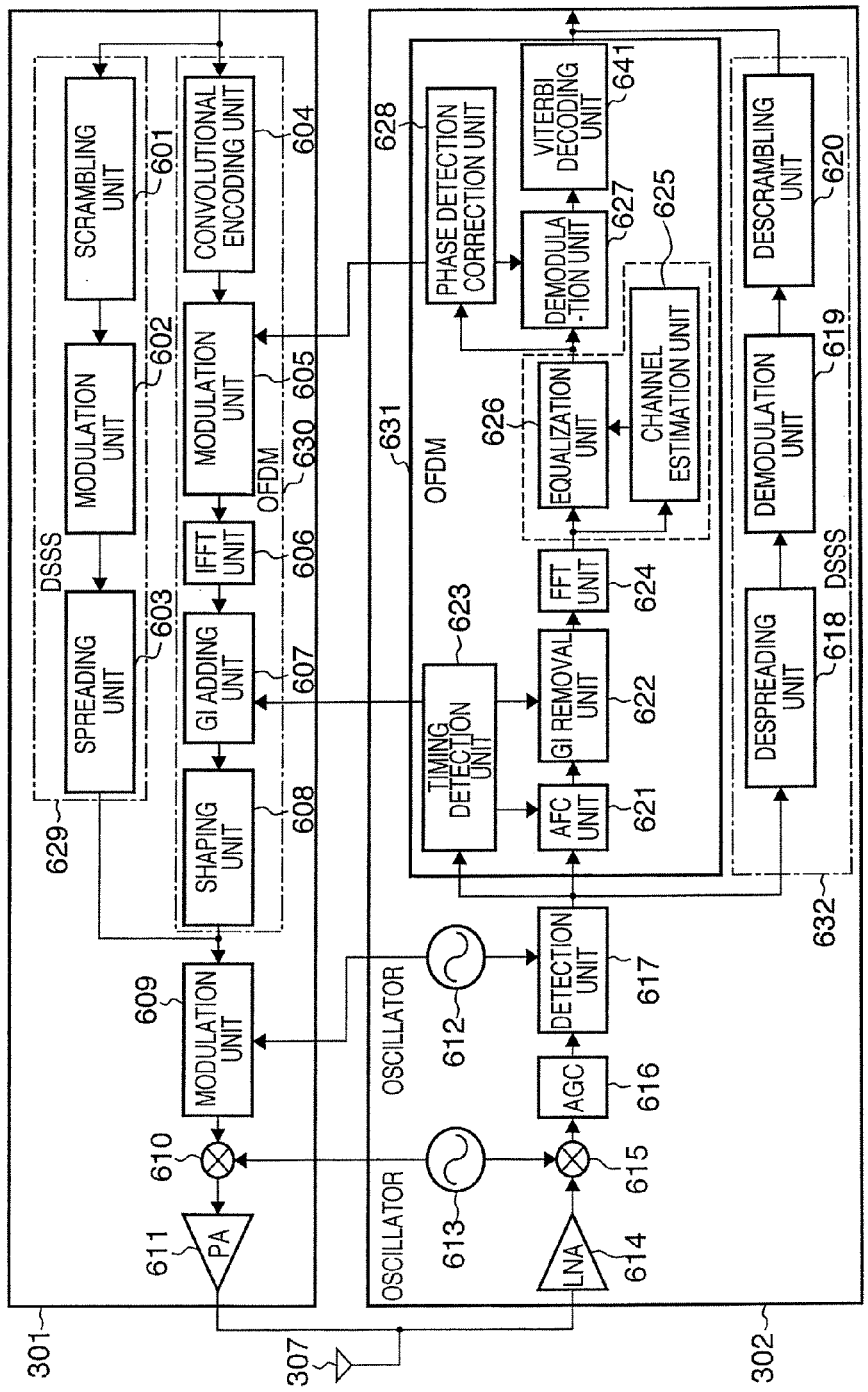
FIG. 6 is a diagram illustrating a detailed configuration of a wireless transmission unit and a wireless receiving unit of a node.

FIG. 6 is a diagram illustrating a detailed configuration of the wireless transmission unit 301 and wireless receiving unit 302 of the node a 101. The same applies to nodes b 102 to i 109.

601 is a scrambling unit for randomizing a bit string and reducing its correlation with an unrelated bit string; 602 is a modulation unit that performs DBPSK modulation; and 603 is a spreading unit that performs spectrum spreading using spread code. A DSSS type modulation unit 629 is configured of the scrambling unit 601, modulation unit 602, and spreading unit 603.

604 is a convolutional encoding unit that performs redundant encoding for error correction processing. 605 is a modulation unit that divides input data among 48 subcarriers and performs 64QAM modulation. 606 is an IFFT unit that performs an inverse Fast Fourier Transform on each modulated subcarrier signal. 607 is a GI adding unit that adds a guard interval for canceling the influence of delay interference waves. 608 is a shaping unit that performs waveform shaping in order to reduce out-of-band power. An OFDM type modulation unit 630 is configured of the convolutional encoding unit 604, modulation unit 605, IFFT unit 606, GI adding unit 607, and shaping unit 608. Additionally, the modulation unit 605 and GI adding unit 607 perform symbol synchronization in accordance with the synchronization signal from the wireless receiving unit 302.

609 is a modulation unit that performs orthogonal modulation at an intermediate frequency. 610 is a multiplier that converts a signal into a wireless carrier frequency. 611 is a PA that amplifies the wireless transmission power.

Only one of the DSSS type modulation unit 629 and the OFDM type modulation unit 630 operates. In other words, the transmitted data is processed by either the scrambling unit 601 or the convolutional encoding unit 604. The processed data is then output from either the spreading unit 603 or the shaping unit 608, and input into the modulation unit 609.

612 is an oscillator that generates an intermediate frequency, whereas 613 is an oscillator that generates a wireless carrier frequency. 614 is an LNA that amplifies a received signal. 615 is a multiplier that extracts a signal tuned by the wireless carrier frequency. 616 is an automatic gain control (AGC) that automatically adjusts the signal strength to a predetermined amplitude strength. 617 is a detection unit that converts the frequency of the signal to an intermediate frequency and performs quadrature detection.

618 is a despreading unit that multiplies the spread signal by spread code and produces the original signal. 619 is a demodulation unit that generates the original data from the DBPSK-modulated signal. 620 is a descrambling processing unit that returns the scrambled data to its original state. A DSSS type demodulation unit 632 is configured of the despreading unit 618, the demodulation unit 619, and the descrambling processing unit 620.

621 is an automatic frequency control (AFC) unit that corrects errors in the wireless carrier frequency. 622 is a GI removal unit that removes the guard interval added at the time of transmission. 623 is a timing detection unit that detects, from the received signal, the synchronization timing between the frequency synchronization of the wireless carrier frequency, the frequency synchronization of the intermediate frequency, and the frequency symbol. 624 is a FFT unit that performs a Fast Fourier Transform for dividing the received data into each of the subcarriers. 625 is a channel estimation unit that estimates transmission path distortion of the subcarrier signal, and 626 is an equalization unit that removes transmission path distortion from the received data in accordance with the estimation of the transmission path distortion. In other words, the processing performed by the channel estimation unit 625 and equalization unit 626 is maximum likelihood processing that estimates the original data from the received data including a multipath signal and the like. 627 is a demodulation unit that restores the original data per subcarrier. 628 is a phase detection correction unit that detects the phase of each subcarrier and generates a correction signal, and 641 is a Viterbi decoding unit that performs error correction on the convolutionally encoded data and restores the original data. An OFDM type decoding unit 631 is configured of the stated functional processing units from the AFC unit 621 to the Viterbi decoding unit 641.

The timing detection unit 623 and the phase detection correction unit 628 synchronize a detected timing with the synchronization cycle of the overall system, and hold that synchronization; the timing detection unit 623 and the phase detection correction unit 628 operate spontaneously even during periods where there is no received data, and continue to generate a cyclical synchronization signal. By providing the synchronization signal to the modulation unit 605 and the GI adding unit 607 of the wireless transmission unit 301, the operations of the wireless transmission unit 301 and the wireless receiving unit 302 are synchronized. In other words, operations are carried out so that the synchronization timing of the own node is synchronized with the synchronization timing of the received data, and the data is transmitted in accordance with that synchronization timing. In this manner, nodes operate in synchronization with one another, and thus synchronization of the entire communication network, in which nodes are communicating with one another, is established.

(Control Terminal Operations)

Figure 7:
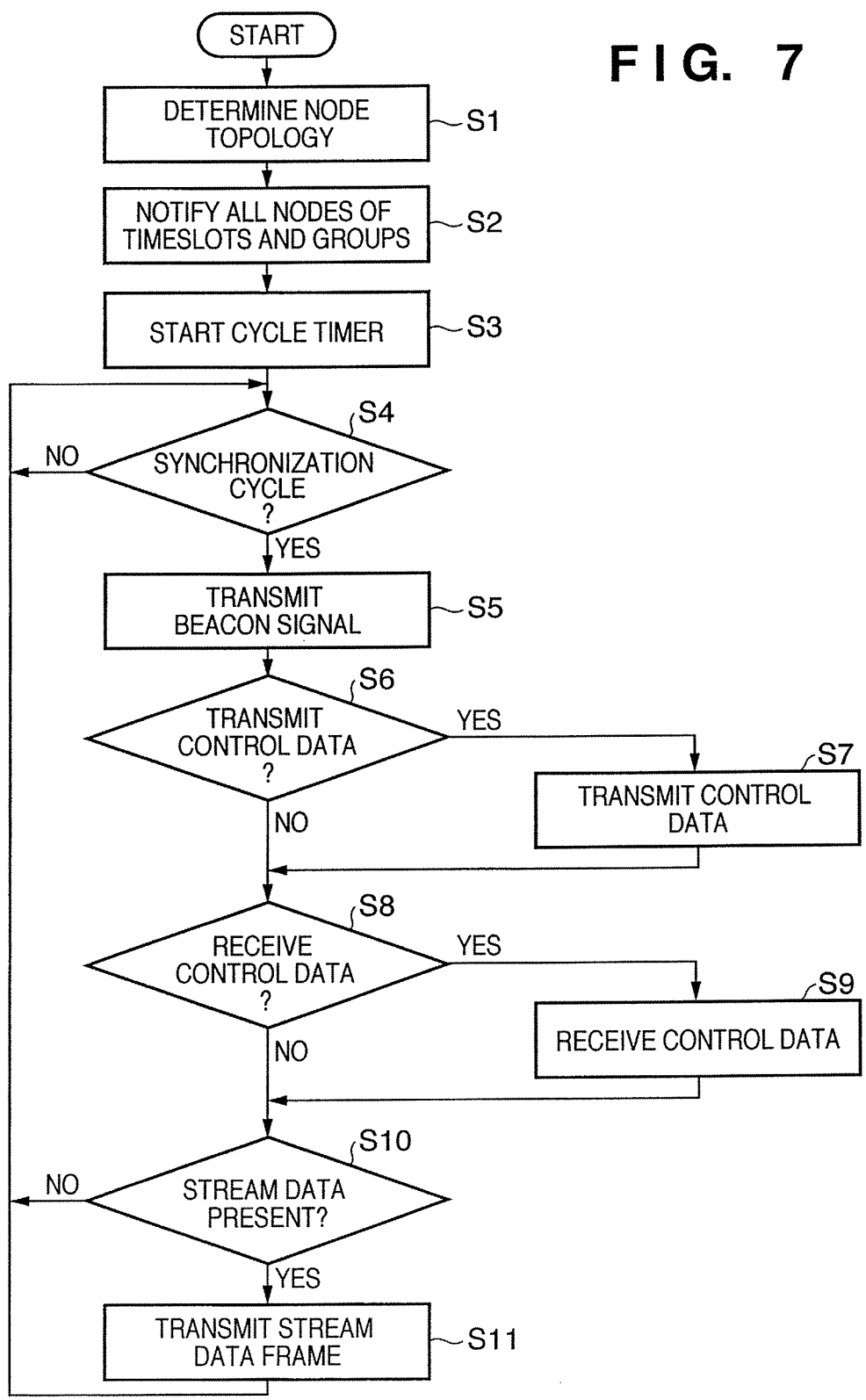
FIG. 7 is a flowchart illustrating an operational procedure performed by a control terminal.
Figure 8B:
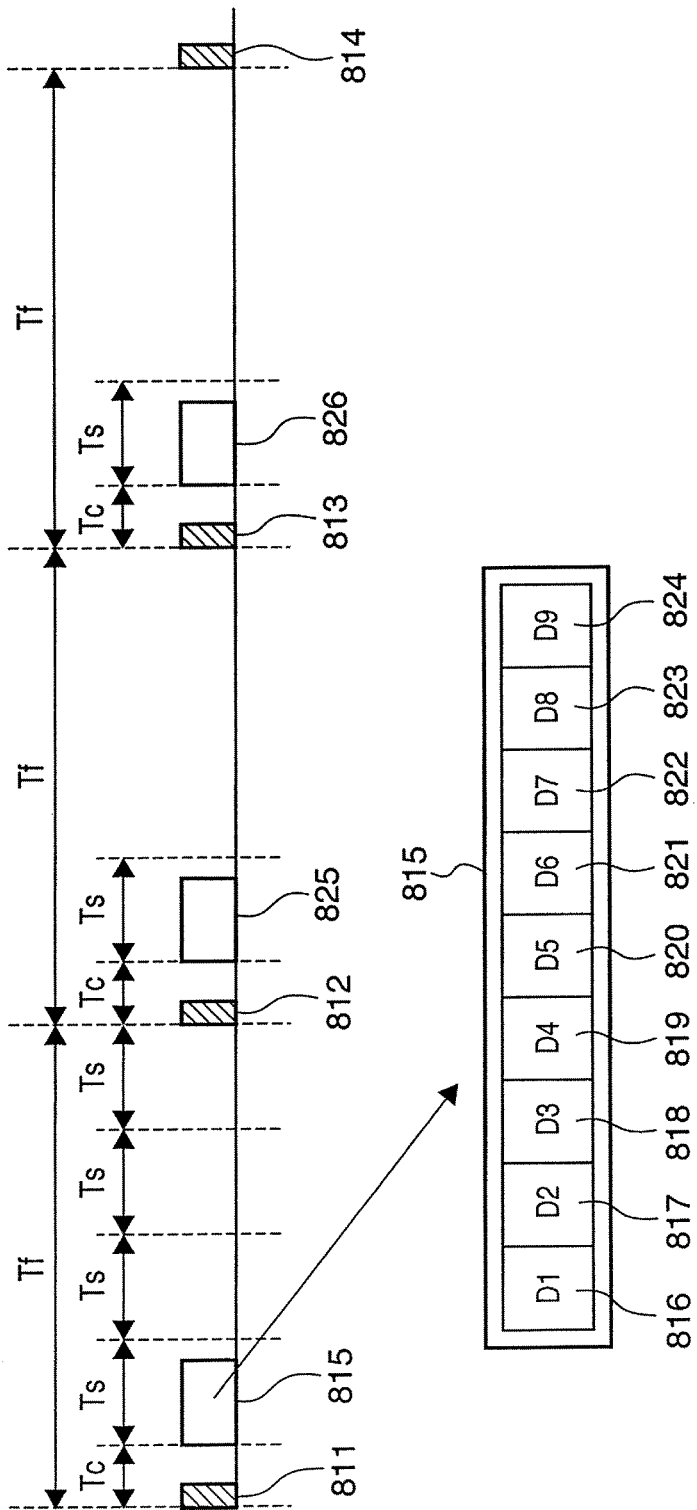

Next, operations of the control terminal 110 shall be described with reference to FIGS. 7, 8A, and 8B. FIG. 7 is a flowchart illustrating an operational procedure performed by the control terminal 110. FIGS. 8A and 8B are time slot diagrams illustrating operations of the control terminal 110.

In FIG. 7, first, the control terminal detects the plural nodes present in the surrounding area, and furthermore performs processing for determining the node topology (Step S1) in order to determine the positional relationships between the nodes. Details of the node topology determination processing shall be provided later.

Next, in accordance with the determined node topology, or in other words, in accordance with the relative positions of the nodes, the timeslot configuration and node group allocation for synchronized communication is determined, and the resultant is communicated to all nodes by the wireless transmission unit 201 using the DSSS technique (Step S2). In the case of the present embodiment, the nodes a 101 to i 109, as shown in FIG. 1, are detected. Then, in accordance with the positional relationship between the nodes and the control terminal 110, the nodes are divided into groups 1 (112), 2 (113), and 3 (114), from the nearer nodes outward. Next, the timeslots are allocated as indicated by in FIG. 8A. 801 is a time interval Tf of the repeat cycle of synchronized transfer. 802 is a shared slot, slot 0, capable of being used in common by the control terminal 110 and the nodes, and the time interval thereof is Tc. 803 is a slot, slot 1, capable of transmission by the control terminal 110. 804 is a slot, slot 2, capable of transmission by the nodes of group 1 (112). 805 is a slot, slot 3, capable of transmission by the nodes of group 2 (113). 806 is a slot, slot 4, capable of transmission by the nodes of group 3 (114). The time intervals for slots 1 to 4 are each the same Ts.

Next, the cycle timer 206 starts timer operations at the cycle Tf of the time division communication in accordance with the stated time slot configuration (Step S3). When the cycle timer 206 reaches the starting time of the synchronization cycle Tf (YES in Step S4), the procedure moves to Step S5.

In Step S5, the control terminal 110 transmits beacon signals for notifying all nodes of the synchronization timing, as indicated by 807 to 810 in (b) of FIG. 8A. These beacon signals (807, 808, 809, and 810) are transmitted from the wireless transmission unit 201 using the DSSS technique, which is capable of long-distance communication.

Next, the control terminal 110 determines whether or not control data to be transmitted through the shared slot, slot 0 (802), is present (Step S6). In the case where such control data is present (YES is Step S6), the procedure moves to Step S7, and the control data to be transmitted is transmitted from the wireless transmission unit 201 using the DSSS technique at the timing of slot 0 (802) indicated by the cycle timer 206. The procedure then moves to Step S8. In the case where the control data is not present (NO in Step S6), the procedure moves to Step S8.

Furthermore, the control terminal 110 determines whether or not control data to be received at the timing of the shared slot, slot 0 (802), as indicated by the cycle timer 206, is present (Step S8). In the case where control data to be received is present (YES in Step S8), the procedure moves to Step S9, and the control data is received by the wireless receiving unit 202 using the DSSS technique. The procedure then moves to Step S10. In the case where control data to be received is not present (NO in Step S8), the procedure moves to Step S10.

Next, the control terminal 110 determines whether or not stream data to be transmitted is present (Step S10). In the case where such stream data is present (YES in Step S10), the procedure moves to Step S11, whereas in the case where such stream data is not present (NO in Step S10), the procedure returns to Step S4 and the process repeats.

In Step S11, transmission is performed from the wireless transmission unit 201 using the OFDM technique, at the timing of the slot 1 (803) indicated by the cycle timer 206, the slot 1 being a slot usable by the control terminal. The stream data frame transmitted at this time is indicated by 815 in FIG. 8B. The stream data frame 815 is configured of stream data D1 (816) to D9 (824) addressed to the respective nodes.

D1 (816), which makes up part of the stream data frame, is stream data addressed to the node a 101. Additionally, D2 (817) is stream data addressed to the node b 102. D3 (818) is stream data addressed to the node c 103. In the same manner, D4 (819) to D9 (824) are pieces of stream data addressed to the nodes d 104 to i 109 respectively. The frame configuration of the transmitted stream data frame 815 is communicated in advance to all nodes in Step S2. Therefore, each node can identify the data portion addressed to itself from among the received stream data frame 815.

When the stream data frame is transmitted in Step S11 in this manner, the control terminal 110 once again returns to Step S4, waits until the starting time of the next synchronization cycle Tf, and repeats the abovementioned operations.

Therefore, the control terminal 110 transmits the beacon signals (811, 812, 813, and 814) per cycle Tf, and transmits the stream data frames (815, 825, 826) through slot 1 (803) per cycle Tf. FIG. 8B illustrates the transmission operations of the control terminal 110 performed at this time.

(Node Operations)

Figure 9:
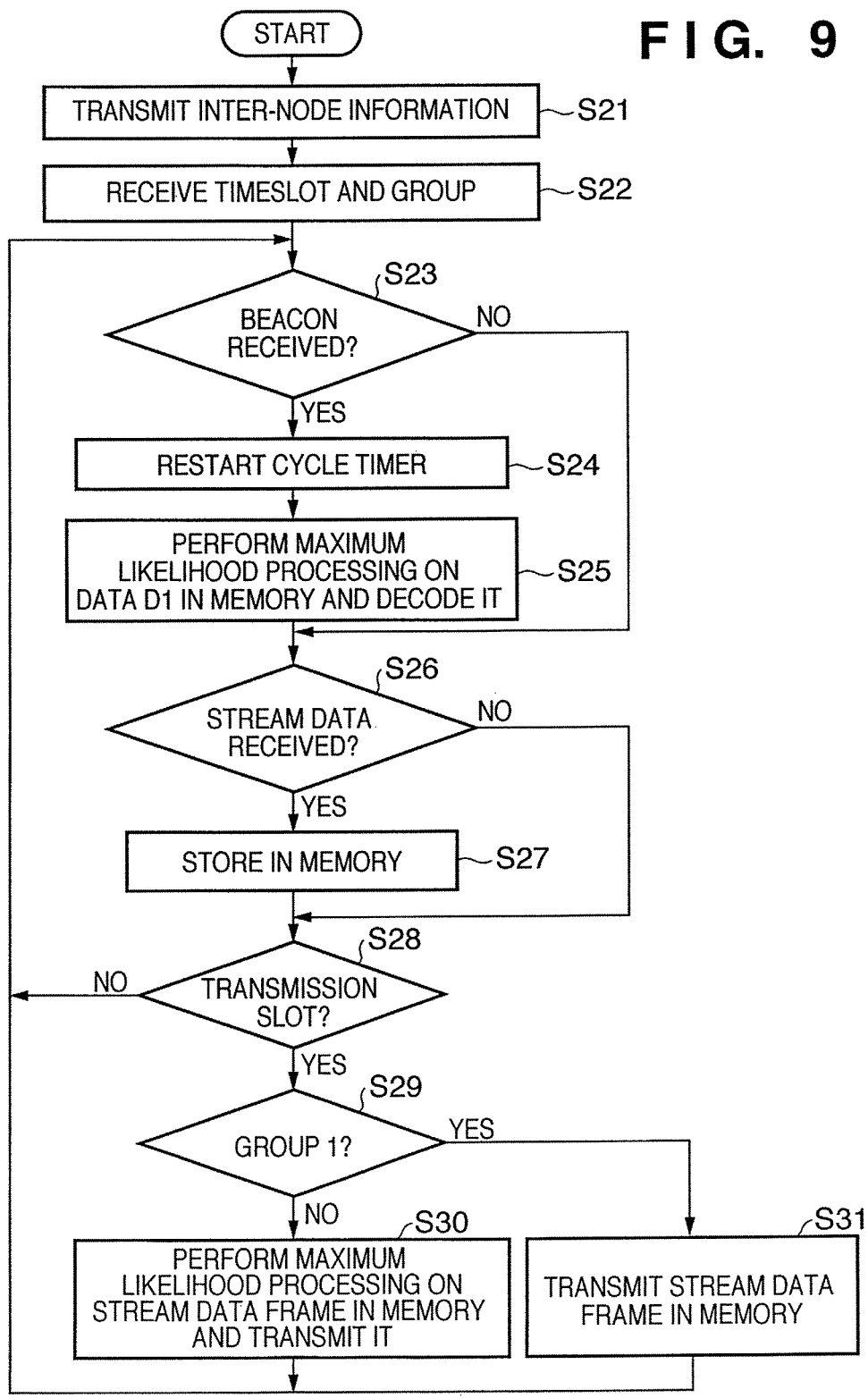
FIG. 9 is a flowchart illustrating a processing procedure performed by each node.

Next, the operations of the nodes shall be described with reference to FIG. 9. FIG. 9 is a flowchart illustrating a processing procedure performed by each node. Note that the descriptions explicitly provided here discuss the case of the operations of the node a 101 as an example; however, the nodes b 102 to i 109 also operate with the same procedure.

First, a single or plural nodes present in the area surrounding the node a 101 are detected, and inter-node information necessary for the control terminal 110 to perform the processing for determining the node topology is transmitted to the control terminal 110 (Step S21). The processing for detecting the surrounding nodes performed by the control terminal 110 shall be described later in detail in the descriptions of the processing for determining the node topology.

Next, control data transmitted from the control terminal 110, including information of the synchronized communication timeslot configuration and the node group allocation, is received by the wireless receiving unit 302 using the DSSS technique (Step S22). Node a (101) acquires the timeslot configuration in accordance with the received control data, identifies the frame configuration of the stream data frame 815, and identifies the layout of the data D1 (816) addressed to itself. In addition, the node a (101) acquires information of the group to which it belongs, in accordance with the received control data, and identifies the slot through which it performs transmission.

Next, the node a (101) determines whether or not a beacon signal has been received (Step S23), and in the case where a beacon signal has been received (YES in Step S23), the procedure moves to Step S24, whereas in the case where a beacon signal has not been received (NO in Step S23), the procedure moves to Step S26. In Step S24, the cycle timer is restarted. Through this restarting process (Step S24), the cycle timer 206 of the control terminal 110 and the cycle timer 307 of the node a (101) are synchronized, and determination of the cycle Tf and slots 0 to 4 becomes possible on the node side.

Next, the node a (101) extracts plural pieces of stream data D1 addressed to itself from among the plural stream data frames stored in the memory 304, and sends the stream data D1 to the maximum likelihood processing unit 305; the data on which maximum likelihood processing has been performed is sent to the decoding unit 306 and decoded into AV data (Step S25). However, when there is only a single piece of stream data D1 in the memory 304, the maximum likelihood processing is bypassed, and the stream data D1 is sent to the decoding unit 306. Additionally, storage of the received stream data within the memory 304 occurs in Step S27, which shall be described later.

Next, the node a 101 determines whether or not the wireless receiving unit 302 is receiving stream data (Step S26). In the case where receiving is being carried out (YES in Step S26), the procedure moves to Step S27, whereas in the case where receiving is not being carried out (NO in Step S26), the procedure moves to Step S28. In Step S27, the stream data frame is received by the wireless receiving unit 302 using the OFDM technique, and is stored in the memory 304. Here, the node a 101 has, within a single Tf cycle, three receiving slots, or the slots 1 (803), 3 (805), and 4 (806), which are slots aside from the node a 101's own transmission slot. Therefore, although processing for storing the stream data frame occurs three times within a single Tf cycle, these are stored independently in the memory 304 and are used in the maximum likelihood processing of the aforementioned Step S25.

Next, it is determined whether or not the time indicated by the cycle timer 307 is the transmission slot of the node itself (Step S28). The transmission slot is slot 2 if the node is in group 1 (112), slot 3 if the node is in group 2 (113), and slot 4 if the node is in group 3 (114). Then, if the current time is the starting timing of the transmission slot (YES in Step S28), the procedure moves to Step S29, whereas in other cases (NO in Step S28), the procedure returns to Step S23.

In Step S29, it is determined whether or not the group to which the node itself belongs is group 1 (112). To rephrase, in Step S29, it is determined whether a stream data frame is being received a plurality of times at the starting time of the transmission slot of the node itself. In the case where the node belongs to group 1, the stream data frame is received directly from the control terminal 110; thus, the same data is not being received a plurality of times, and the maximum likelihood processing is therefore unnecessary. As opposed to this, in the case where the node does not belong to group 1, the same data is received a plurality of times from plural nodes, and therefore it is necessary to carry out the maximum likelihood processing. In the case where the node has been determined not to belong to group 1 (112) (NO in Step S29), the procedure moves to Step S30, whereas in the case where the node has been determined to belong to group 1 (112) (YES in Step S29), the procedure moves to Step S31.

In Step S30, the stream data frames within the memory 304 are sent to the maximum likelihood processing unit 305, and the stream data frame obtained by performing the maximum likelihood processing is transmitted from the wireless transmission unit 301 using the OFDM technique. The stream data frame transmitted at this time is a frame in which the stream data D1 (816) to D9 (824) of all nodes are included. On the other hand, in Step S31, one of the stream data frames within the memory 304 and received from the control terminal 110 is transmitted as-is from the wireless transmission unit 301 using the OFDM technique.

In the manner described thus far, upon transmitting the stream data in Step S30 or Step S31, the node a 101 once again returns to Step S23, and the abovementioned processing is repeated. Accordingly, each node repeats the following process within a Tf cycle: receiving stream data a plurality of times; performing maximum likelihood processing on and decoding the data addressed to itself from among the received data; and performing maximum likelihood processing on and transmitting the received stream data.

(Cooperative Operations Between Control Terminal and Node)

FIGS. 10A, 10B, 10C, 10D, and 11 illustrate the operations of the control terminal 110 and the nodes 101 to 109 as described above. FIGS. 10A, 10B, 10C, and 10D are diagrams conceptually illustrating the change over time of the transmission of stream data by the control terminal 110 and the nodes. FIG. 11 is a diagram illustrating transmission of stream data by the control terminal 110 and nodes on the time axis.

Figure 10A:
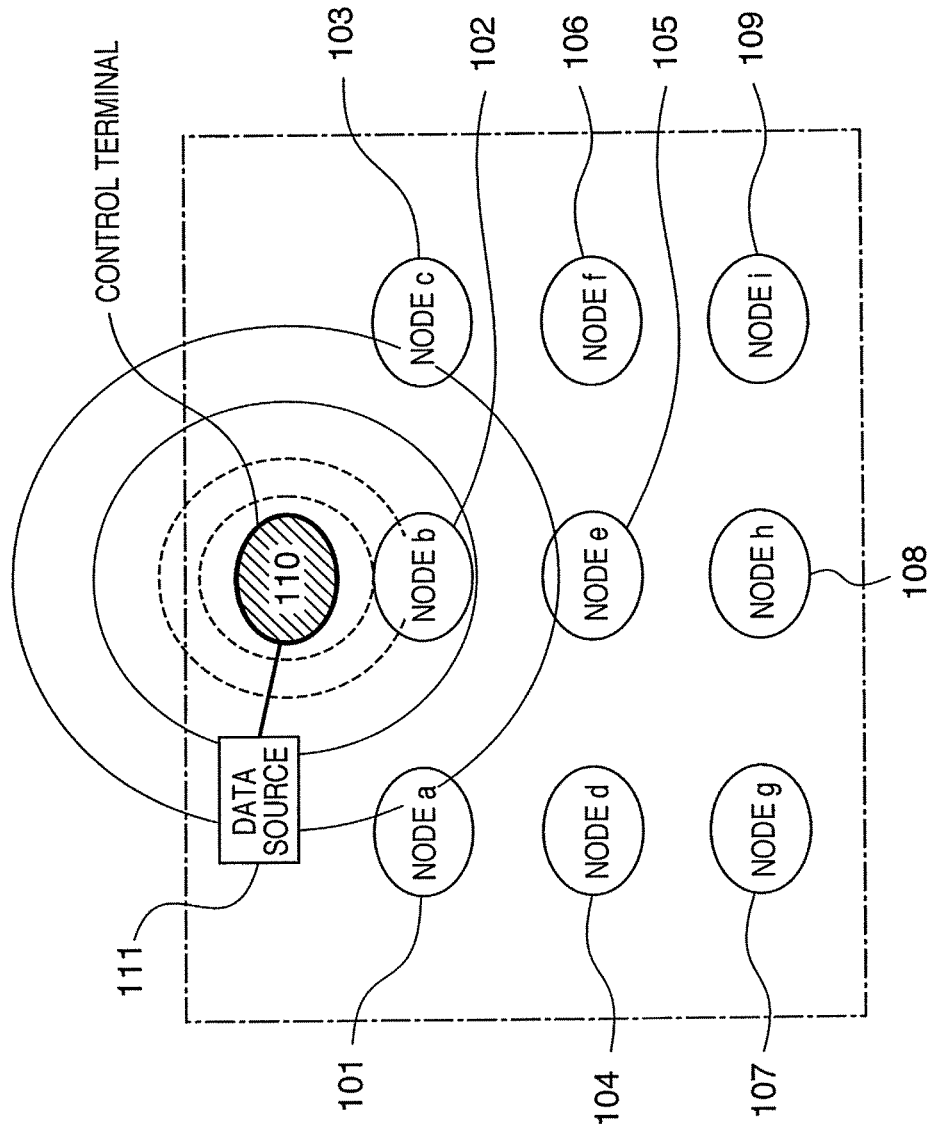

First, in the time of slot 1 (803) shown in FIG. 11, the control terminal 110 transmits a stream data frame, as shown in FIG. 10A. At this time, the signal that reaches the nearby nodes a 101, b 102, and c 103 is strong, and thus the stream data frame can be received with a low rate of error. However, as the position of the node grows more distant, the signal that reaches that node grows weaker, and thus distant nodes receive the stream data frame with a high rate of error. The stream data frame transmitted by the control terminal 110 at this time is the data frame indicated by 815 in FIG. 11. As shown in FIG. 8B, the data frame 815 includes data addressed to all of the nodes a 101 to i 109.

Next, in the time of slot 2 (804), the nodes a 101 to c 103 of group 1 (112) transmit stream data frames, as shown in FIG. 10B. At this time, the signal that reaches the nearby nodes d 104 to f 106 is strong, and thus the stream data frames can be received with a low rate of error. However, as the position of the node grows more distant, the signal that reaches that node grows weaker, and thus distant nodes receive the stream data frames with a high rate of error. The stream data frames transmitted by the nodes a 101 to c 103 at this time are the frame data indicated by 901 to 903 in FIG. 11. In other words, the nodes a 101, b 102, and c 103 transmit the data frames they received in slot 1 (803) as-is, and therefore the same data is transmitted from three points simultaneously. When the same data is transmitted simultaneously from plural points, it can be handled in the same way as a multipath wave, as far as the receiving nodes are concerned; accordingly, maximum likelihood processing and estimation of the original data can be performed by the channel estimation unit 625 and the equalization unit 626 of the wireless receiving unit 302 in each node.

Figure 10C:
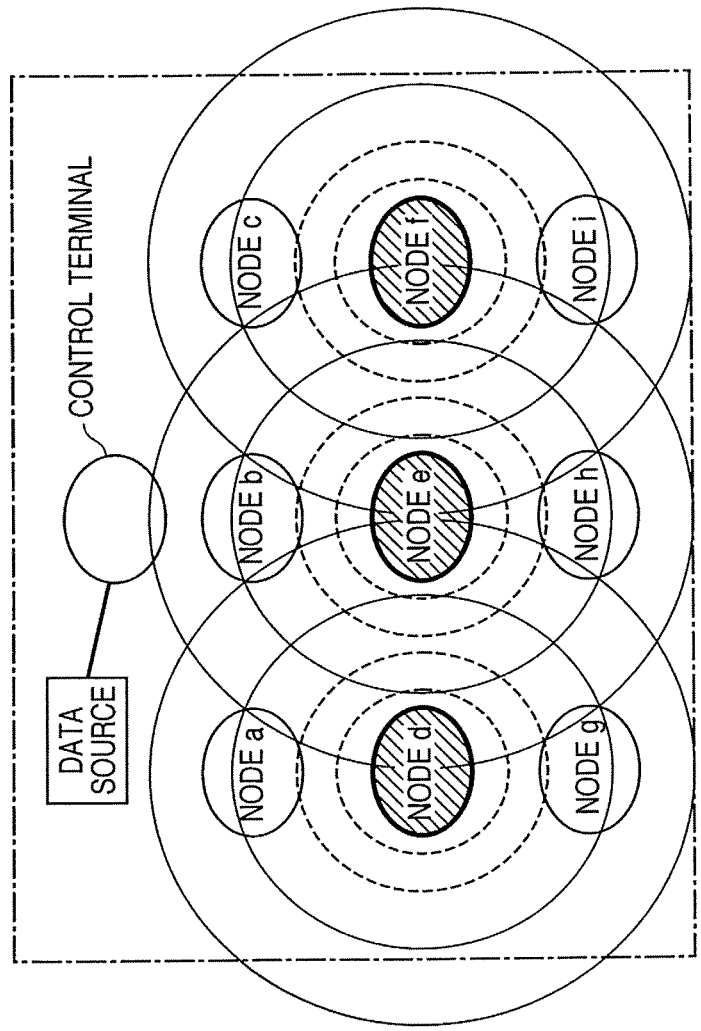

Next, in the time of slot 3 (805), the nodes d 104 to f 106 of group 2 (113) transmit stream data frames, as shown in FIG. 10C. At this time, the signal that reaches the nearby nodes a 101 to c 103 and g 107 to i 109 is strong, and thus the stream data frames can be received with a low rate of error. However, as the position of the node grows more distant, the signal that reaches that node grows weaker, and thus distant nodes receive the stream data frames with a high rate of error. The stream data frames transmitted by the nodes d 104 to f 106 at this time are the frame data indicated by 904 to 906 in FIG. 11. In other words, the nodes d 104 to f 106 perform maximum likelihood processing on the data frames received in slot 1 (803) and slot 2 (804) and transmit the data frames, and therefore the same data is transmitted from three points simultaneously. When the same data is transmitted simultaneously from plural points, it can be handled in the same way as a multipath wave, as far as the receiving nodes are concerned; accordingly, maximum likelihood processing and estimation of the original data can be performed by the channel estimation unit 625 and the equalization unit 626 of the wireless receiving unit 302 in each node.

Lastly, in the time of slot 4 (806), the nodes g 107 to i 109 of group 3 (114) transmit stream data frames, as shown in FIG. 10D. At this time, the signal that reaches the nearby nodes d 104 to f 106 is strong, and thus the stream data frames can be received with a low rate of error. However, as the position of the node grows more distant, the signal that reaches that node grows weaker, and thus the stream data frames are received with a high rate of error. The stream data frames transmitted by the nodes g 107 to i 109 at this time are the frame data indicated by 907 to 909 in FIG. 11. In other words, the nodes g 107 to i 109 perform maximum likelihood processing on the data frames received in slot 1 (803), slot 2 (804), and slot 3 (805), and transmit the data frames, and therefore the same data is transmitted from three points simultaneously. When the same data is transmitted simultaneously from plural points, it can be handled in the same way as a multipath wave, as far as the receiving nodes are concerned; accordingly, maximum likelihood processing and estimation of the original data can be performed by the channel estimation unit 625 and the equalization unit 626 of the wireless receiving unit 302 in each node.

Through the stated process, within the repeating cycle Tf, each node receives the same stream data frames from plural nodes and stores the stream data frames in the memory 304. Then, upon receiving the next beacon signal 812, each node extracts plural pieces of data addressed to the node itself from the plural stream data frames stored in the memory 304, performs maximum likelihood processing through the maximum likelihood processing unit 305, and reproduces the original data. The reproduced data is sent to the decoding unit 306.

(Node Topology Determination Processing)

Figure 12:
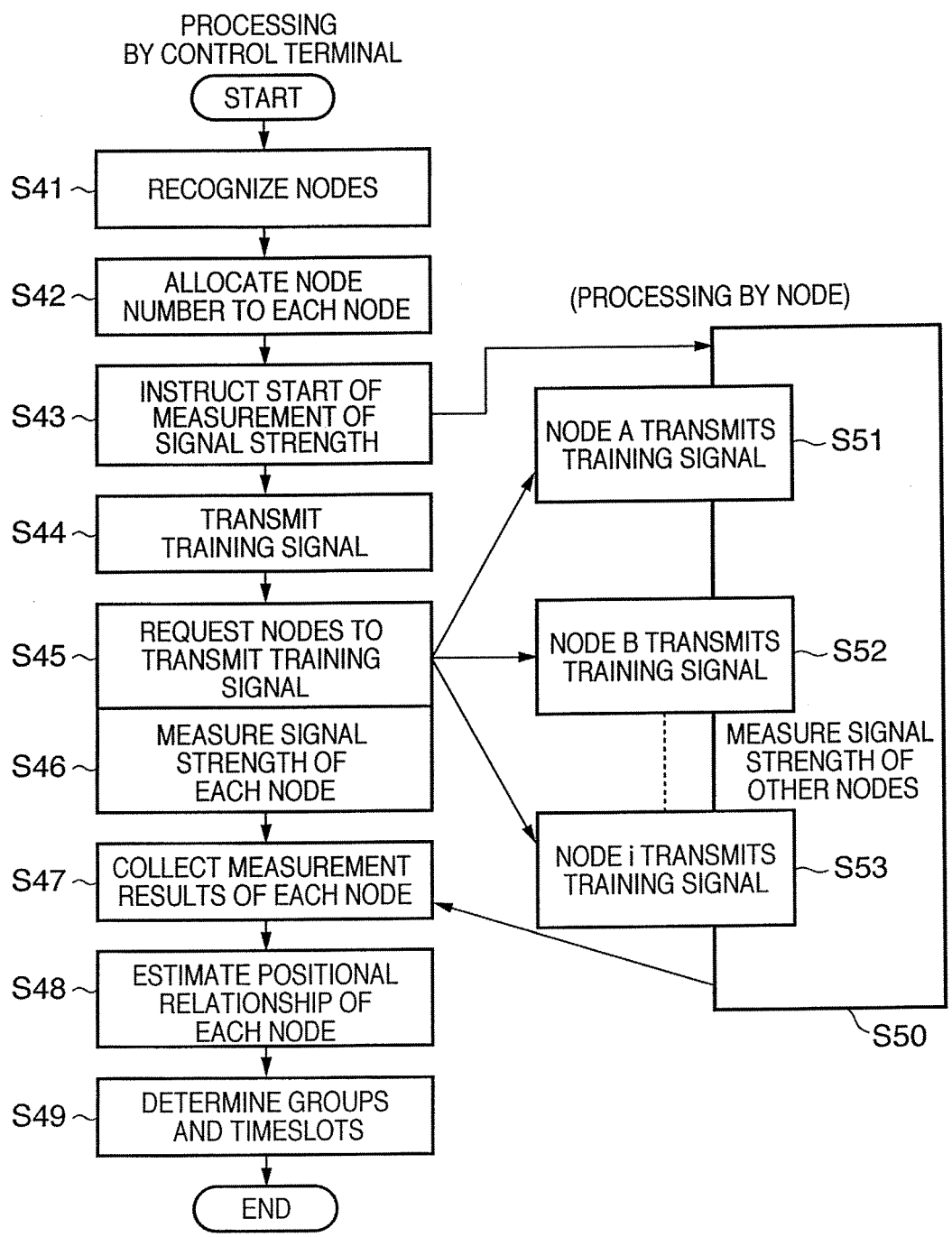
FIG. 12 is a diagram illustrating procedures for node topology determination processing performed by a control terminal and by nodes.

Next, node topology determination processing executed by the control terminal 110 in Step S1 of FIG. 7 shall be described using FIG. 12. FIG. 12 is a diagram illustrating procedures for node topology determination processing performed by the control terminal and by the nodes. Note that the control terminal 110 and the nodes use the DSSS technique when transmitting/receiving wireless signals in this node topology determination process.

First, the control terminal 110 carries out processing for recognizing nodes present in the surrounding area (Step S41). Recognizing nodes is performed through a repeating procedure, in which the control terminal 110 broadcasts an inquiry signal, and the nodes that receive the inquiry signal add an individual ID value, provided individually to each node in advance, to a response signal and broadcast the response signal. The nodes randomly change the transmission timing of the response signal within a range up to a maximum wait time Tmax so as to avoid having their response signals interfere with the response signals from other nodes. The control terminal 110 repeatedly transmits the inquiry signal until response signals cease to arrive within the maximum waiting time Tmax, thereby receiving a response signal from all of the nodes. In this manner, the control terminal 110 acquires the individual ID values of all nodes present in the surrounding area.

Next, the control terminal 110 allocates node numbers, corresponding to the individual ID numbers, to all the recognized nodes, and notifies the nodes of these node numbers (Step S42). Numbers such as node 1, node 2, and node 3, . . . , node 9 are dealt to each node a~i in this manner.

Next, the control terminal 110 instructs all nodes to begin measuring the signal strength of a training signal (Step S43). All nodes that receive this instruction move to a status in which they measure the signal strength of the training signals transmitted in order from the other nodes, including the control terminal, and create measurement result lists (Step S50).

Then, first, the control terminal 110 commences transmission of the training signal (Step S44). Note that this training signal has a preset transmission power strength, and is transmitted at the same signal strength from the control terminal 110 and all the nodes.

Next, the control terminal 110 sequentially requests each node to transmit a training signal of a preset transmission power strength (Step S45). That is, the control terminal 110 selects each node sequentially, and requests the select node to transmit the training signal. The nodes that receive the request instruction transmit the training signals (Steps S51, S52, and S53). During this time, the control terminal 110 measures the signal strengths of the training signals transmitted by each node (Step S46) Here, as described above, each node is performing the measurement processing of the signal strength of the training signals (Step S50) on receiving the instruction from the control terminal 110 at step S43. When the transmission of the training signal has finished for all nodes, the control terminal 110 then inquires to each node and receives the measurement result list from each node (Step S47).

Figure 14:
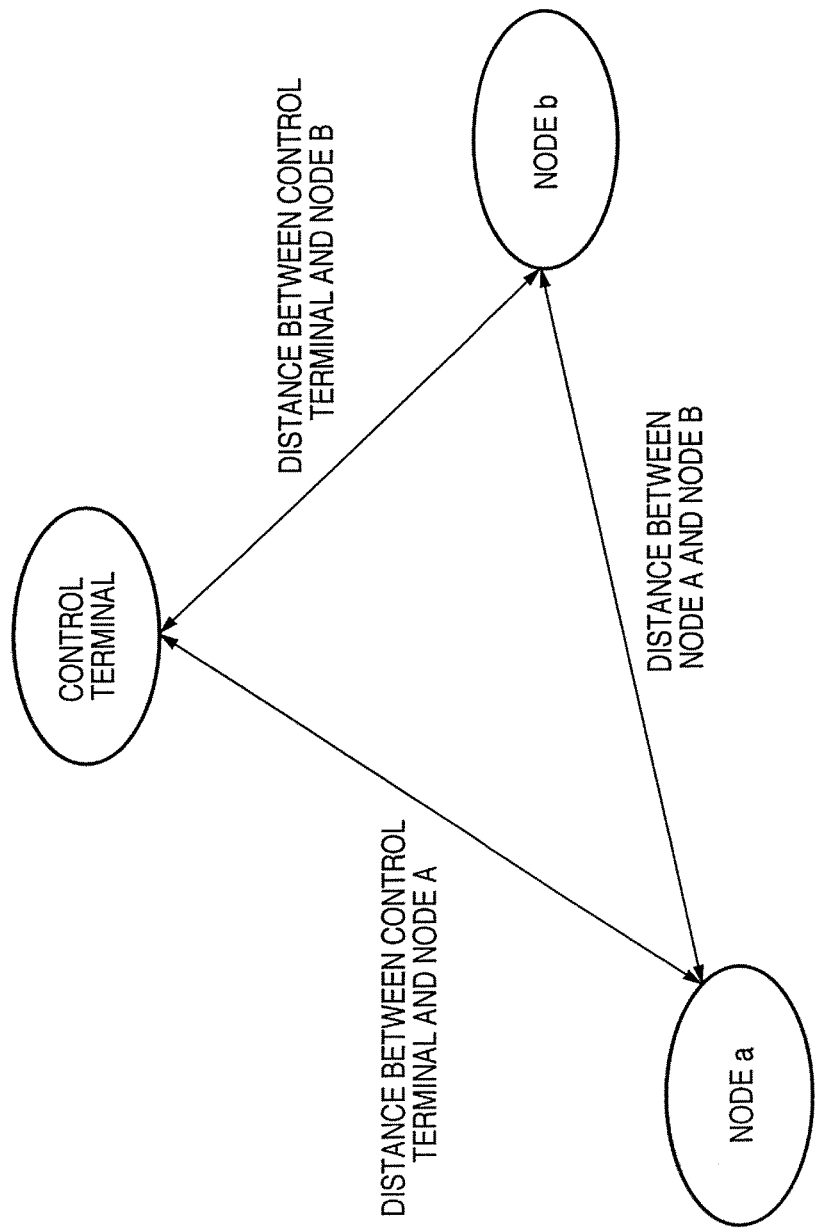
FIG. 14 is a diagram schematically illustrating the estimation of a positional relationship through the triangulation method.

The received signal strength of the training signals received by the control terminal 110 and the nodes is inversely proportional to the distance between nodes, as illustrated in FIG. 13. FIG. 13 is a diagram schematically illustrating a relationship between the strength of a received training signal and the distance between nodes. Accordingly, the control terminal 110 is provided with a list in which the corresponding relationship between the received signal strengths and the distances is pre-measured, and from this measurement result list, determines the distance between the nodes. If the distance between the nodes can be determined, it is possible to estimate the positional relationship between each of the nodes using a publicly known triangulation method such as that illustrated in FIG. 14 (Step S48). FIG. 14 is a diagram schematically illustrating the estimation of a positional relationship through the triangulation method. The distance between the control terminal 110 and the nodes (for example, the distance between the control terminal and the nodes a and b) can be estimated based on the training signal received in Step S46. In addition, the distance between nodes (for example, the distance between the nodes a and b) can be estimated based on the measurement results received in Step S47 (for example, the measurement results from nodes a and b).

The control terminal 110 first determines the length of the necessary stream data frame 815 based on the total number of nodes, and then determines the beacon cycle Tf 801 based on the bitrate of the stream data frame. The control terminal 110 then determines the number of group divisions based on the beacon cycle Tf, the data frame length, and the total number of nodes. In this manner, the time slot configuration such as that shown in FIGS. 8A and 8B is determined; adjacent nodes positioned close to the control terminal 110 are configured into the same group based on the positional relationships between the nodes; and the layout map shown in FIG. 1 is created. Then, in accordance with the layout map, the groups to which the nodes belong and the time slot configuration are determined, and the determination is communicated to the nodes (Step S49).

In the configuration according to the present embodiment as described thus far, plural communication terminals make up a synchronized-type network; within each synchronization cycle, plural transmission terminals transmit data of a predetermined length, and receiving terminals perform maximum likelihood processing on the plural pieces of received data and finalize the received data. Thus, according to the configuration of the present embodiment, plural communication devices redundantly transmit the same data within the same cycle; therefore, an abnormality arising in a single communication connection is solved through the other communication connections, and the data can be transmitted to all of the communication devices within the same cycle. Additionally, all of the terminals are temporally synchronized, which makes it possible to avoid transmissions from interfering with one another. Accordingly, it is possible to realize communication in which data disconnections and interruptions do not occur, even when handling stream data that is temporally continuous, such as video or audio. It is also possible to carry out communication in which plural transmission terminals simultaneously transmit plural data streams without interfering with one another.

Embodiment 2

In the previously described embodiment, nodes belonging to the final group also transmit stream data frames. However, in order to effectively utilize the communication bandwidth, the nodes of the final group may operate so as not to carry out transmission when the redundancy of the received data of each of the nodes is ensured. For example, in the case where the number of groups is three, as in the first embodiment, slot 4 becomes unnecessary, and thus it is possible to reduce the bandwidth used by all nodes within the repeating cycle Tf by omitting communication through slot 4.

Figure 15:
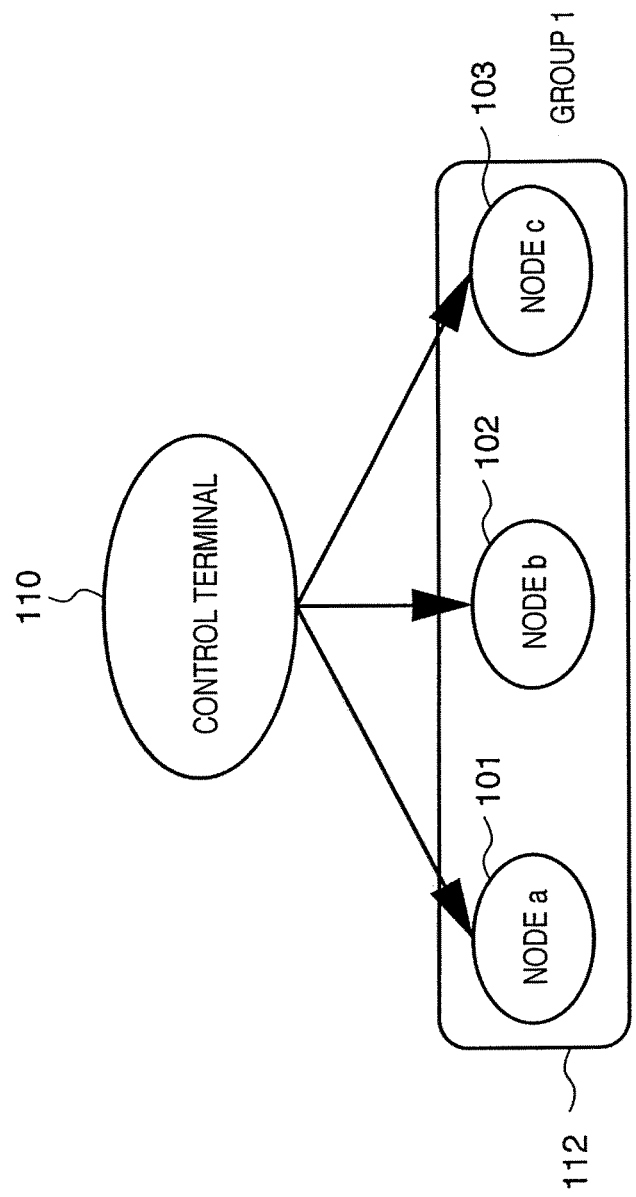
FIG. 15 is a diagram schematically illustrating a configuration of a network when there is a single group.

Under these conditions, the method of allocating the time slots in accordance with the number of groups may be performed as follows. Descriptions shall first be provided regarding the case where there is a single group. In this case, as illustrated in FIG. 15, all nodes receive data directly from the control terminal, and thus the nodes in group 1 (112) do not need to transmit the received data further on. FIG. 15 is a diagram schematically illustrating a configuration of a network when there is a single group. Therefore, the only timeslots required are two slots, or the shared slot, slot 0, and the transmission slot, slot 1. In this case, the redundancy in each node is only 1; however, because the data transmitted from the control terminal 110 is the most correct data, a higher redundancy is not necessary. If a node within the group has a poor reception state, that node may be separated into a different group.

Figure 16:
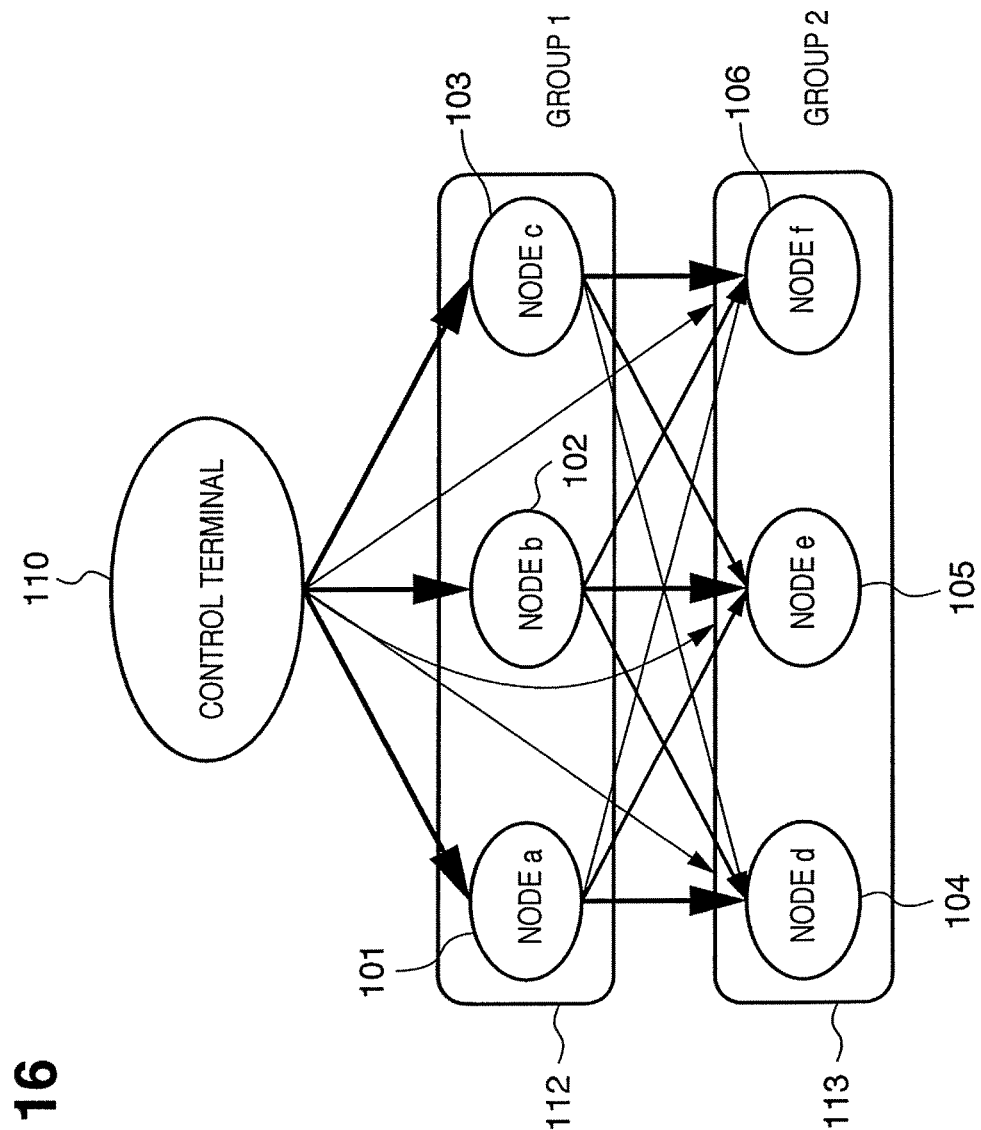
FIG. 16 is a diagram schematically illustrating a configuration of a network when there are two groups.

Next, descriptions shall be provided regarding the case where there are two groups. In this case, when the nodes of group 2, which is the final group, do not carry out transmission, the data path through which the nodes carry out reception is as illustrated in FIG. 16. FIG. 16 is a diagram schematically illustrating a configuration of a network when there are two groups. The nodes in group 1 (112) only receive the transmission data from the control terminal 110, and thus the redundancy thereof is 1. The nodes in group 2 (113) receive the transmission data from the control terminal 110 and the transmission data from the nodes of group 1 (112), and thus the redundancy thereof is 2. Therefore, if the nodes of group 2 (113) carry out transmission further on, the redundancy of the nodes in group 1 (112) can be set at 2. At first glance, having group 1 (112) receive the transmission data of group 2 (113) appears to be meaningless. However, for example, due to the transmission performed by group 2 (113), the node a 101 receives data on a direct path from the control terminal 110, and furthermore receives the data sent on a path from the control terminal 110 via the node c 103 and the node e 105. Accordingly, it is possible to set the redundancy with data received from differing paths at 2, making it possible to expect a reduction in errors through the maximum likelihood processing.

Detailed descriptions of the process for determining groups and timeslots (Step S49 in FIG. 12) performed by the control terminal 110, which carries out the above-described operations, shall be provided with reference to FIG. 17. FIG. 17 is a flowchart illustrating a procedure for processing performed by the control terminal 110 to determine groups and time slots in the present embodiment.

First, the control terminal 110 finalizes the layout and number of all nodes, in the same manner as the process from Step S41 to Step S48 in the aforementioned first embodiment (Step S61). Then, the control terminal 110 determines the length of the necessary stream data frame 815 based on the total number of nodes, and then determines the beacon cycle Tf (801) based on the bitrate of the stream data frame (Step S62). The control terminal 110 then determines the number of group divisions N based on the beacon cycle Tf, the data frame length, and the total number of nodes (Step S63).

Next, in the case where the number of group divisions N is 1 (YES in Step S64), the number of slots into which the cycle Tf is divided is set to N+1 (Step S65). In other words, the cycle Tf is divided by two slots: slot 0, which is the shared slot, and slot 1, which is the transmission slot of the control terminal 110. The procedure then moves to Step S70.

Next, in the case where the number of group divisions N is 2 (YES in Step S66), the number of slots into which the cycle Tf is divided is set to N+2 (Step S67). In other words, the cycle Tf is divided by four slots: slot 0, which is the shared slot; slot 1, which is the transmission slot of the control terminal 110; slot 2, which is the transmission slot of group 1; and slot 3, which is the transmission slot of group 2. The procedure then moves to Step S70.

In the case where the number of group divisions N is three or more (YES in Step S68), the number of slots into which the cycle Tf is divided is set to N+1 (Step S69). In other words, the cycle Tf is divided by N+1 slots: slot 0, which is the shared slot; slot 1, which is the transmission slot of the control terminal 110; and slots 2 to N, which are the transmission slots of groups 1 to (N−1). The procedure then moves to Step S70.

In this manner, the time slot configuration such is determined in accordance with the number of group divisions N; adjacent nodes positioned close to the control terminal 110 are configured into the same group based on the positional relationships between the nodes; and a layout map identical to that shown in FIG. 1 is created. Then, in Step S70, in accordance with the layout map, the groups to which the nodes belong and the time slot configuration are determined, and the determination is communicated to the nodes.

As described thus far, according to the configuration of the present embodiment, groups that do not need to transmit data further on, such as the final group to receive the data within each time interval of the repeating cycle, do not carry out communication. For this reason, according to the configuration of the present embodiment, it is possible to allocate the groups necessary for communication to a longer time interval, and thus it is possible to increase the speed of data transfer.

Embodiment 3

In the first and second embodiments, the beacon signal is used only as a signal that communicates the timing of the repeating cycle Tf. However, by adding control information to this beacon signal, the control terminal 110 may communicate the timings of each of the slots, specify the node that uses the shared slot, and so on.

Figure 18:
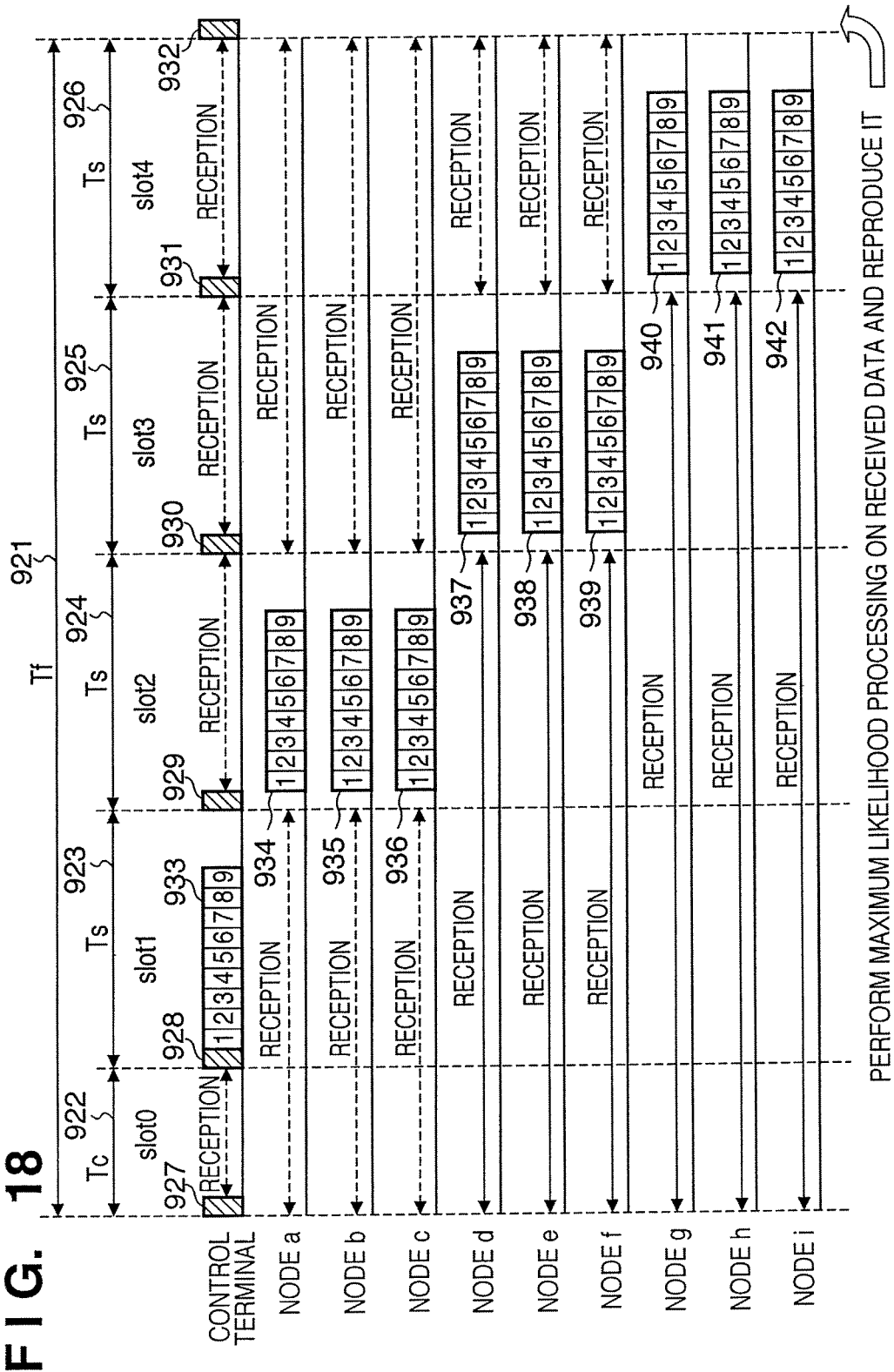
FIG. 18 is a diagram illustrating transmission of stream data by the control terminal and nodes on the time axis in the case where control information has been added to a beacon signal.

FIG. 18 is a diagram illustrating transmission of stream data by the control terminal 110 and nodes on the time axis in the case where control information has been added to the beacon signal. In FIG. 18, 921 is the repeating cycle Tf, 922 is the shared slot, slot 0, and 923 is the transmission slot, slot 1, of the control terminal 110. 924 to 926 are transmission slots, slots 2 to 4, of groups 1 to 3 respectively. 927 to 932 are beacon signals to which control information has been added. 933 is a stream data frame transmitted by the control terminal 110, whereas 934 to 942 are stream data frames transmitted by the nodes a 101 to i 109 respectively.

Information indicating the start of the cycle Tf and information indicating that node a 101 is permitted to use the shared slot, slot 0, is added to the beacon signal indicated by 927. If, at this time, node a 101 has information to be communicated to the control terminal 110, node a 101 transmits control data. When node a 101 does not have information to be communicated, node a 101 simply stands by for reception. Nodes b 102 to i 109 also simply stand by for reception.

Information indicating that authority to transmit stream data frames has been given to the control terminal 110 is added to the beacon signal indicated by 928. In response to the beacon signal 928, the control terminal 110 transmits the stream data frame 933.

Information indicating that authority to transmit stream data frames has been given to group 1 is added to the beacon signal indicated by 929. The nodes a 101 to c 103, which receive the beacon signal 929, transmit the stream data frames 934 to 936.

Information indicating that authority to transmit stream data frames has been given to group 2 is added to the beacon signal indicated by 930. The nodes d 104 to f 106, which receive the beacon signal 930, transmit the stream data frames 937 to 939.

Information indicating that authority to transmit stream data frames has been given to group 3 is added to the beacon signal indicated by 931. The nodes g 107 to i 109, which receive the beacon signal 931, transmit the stream data frames 940 to 942.

Lastly, information indicating the start of the cycle Tf and information indicating that node b 102 is permitted to use the shared slot, slot 0, is added to the beacon signal indicated by 932.

Information of the control terminal 110, node a 101, node b 102, node c 103, and on up to node i 109 is specified repeatedly in sequence, as information of terminals permitted to carry out transmission, in the beacon signal sent at the beginning of the cycle Tf.

In this manner, it is easier to achieve synchronization between nodes by having the starting timing of each slot be communicated by the beacon signal. Additionally, the number of the node permitted to perform transmission may be specified rather than the group number that is added to the beacon signal. Doing so makes it acceptable to carry out transmission of the received data in accordance with the node number specified in the beacon signal, even if each node is not aware of the group to which it belongs. Accordingly, it is possible to simplify the operational processing of the nodes.

Embodiment 4

In the first embodiment, maximum likelihood processing is performed on data transmitted simultaneously from plural nodes in the same manner as with multipath communication by the estimation unit 625 and the equalization unit 626, and the original data is estimated. However, OFDM subchannels may be divided/allocated per transmission node, the data may be stored as individual data in the memories 304 of the nodes on the receiving side, and maximum likelihood processing may be performed by the maximum likelihood processing unit 305.

In this case, for example, the OFDM technique in the present embodiment divided communication into 48 subchannels, and the channels can be allocated for use by the nodes as follows:

channels 1 to 16: node a 101, node d 104, and node g 107;
channels 17 to 32: node b 102, node e 105, and node h 108;
channels 33 to 48: node c 103, node f 106, and node i 109.

In this case, regarding the transmission data sent from the control terminal 110, the same data is transmitted redundantly over channels 1 to 16, 17 to 32, and 33 to 48, respectively.

By using such a configuration, it is possible for each node to distinguish transmission nodes and receive the data; thus it is possible to more accurately restore the original data through the maximum likelihood processing.

Embodiment 5

In the above embodiments, descriptions are given assuming an example in which the wireless scheme used by the wireless transmission units 201 and 301 and the wireless receiving units 202 and 302 is the Time Division Multiple Access (TDMA) technique. However, the wireless scheme used is not limited thereto. For example, the Code Division Multiple Access (CDMA) technique may be used. In this case, different spread code is allocated per node that performs transmission at the same time as another node, and the wireless transmission units modulate the transmission data using the CDMA technique with the spread code allocated to their own nodes, and transmit the data. On the other hand, the wireless receiving units are provided with plural spread code correlation devices; by performing plural correlations on received signals, signals transmitted simultaneously from plural nodes are each divided, received, and stored in the memories. Then, maximum likelihood processing is performed on the respective pieces of received data and the original data is estimated.

Alternatively, the wireless scheme used by the wireless transmission units 201 and 301 and the wireless receiving units 202 and 302 may be the Frequency Division Multiple Access (FDMA) technique. In this case, transmission frequencies are allocated per node that simultaneously performs transmission. The wireless receiving units are provided with plural receiving units in parallel; data received simultaneously in parallel may be stored in the memories per frequency, maximum likelihood processing performed on the received data within the memories, and the original data estimated.

Alternatively, the space-division multiple access technique may be used. Or, a combination of the abovementioned communication techniques may be used.

In this manner, by using wireless techniques as necessary, it is possible to carry out communication appropriate for the applications and goals of the communication.

Embodiment 6

In the stated embodiments, the layout of the nodes is determined using the received signal strength of the wireless signal (the strength of the signal transmitted from the nodes); however, the layout may be determined using an optical device, an acoustic device, or a different kind of measurement device, or, alternatively, a combination of these.

For example, in the case of using an optical device (an optical imaging device), the control terminal is provided with a camera and a range finding unit for autofocus; the nodes are identified from an image captured by the camera, and the distance to each node is measured by the range finding unit. Through this, the control terminal can determine the layout of the nodes.

Or, for example, in the case of using an acoustic device, the control terminal and the nodes can be provided with a speaker for outputting sound waves (an acoustic signal) or ultrasonic waves (an ultrasonic signal) and a microphone for detecting those waves. In this case, nodes are synchronized to one another; sound waves or ultrasonic waves are output by the nodes in order in synchronization with a reference time; the distance between the nodes is measured based on the amount of delay time before the sound wave reaches the node (the transmission delay); and thereby, the control terminal can determine the layout of the nodes. Alternatively, because ultrasonic waves have strong directivity, a device that structurally scans the space may be provided; the layout of the nodes is detected by measuring the delay of a reflected ultrasonic wave, using publicly known sonar technology, and the control terminal may determine the node layout thereby.

Furthermore, a publicly known Global Positioning System (GPS) unit may be provided in each node; each node autonomously detects its own position and communicates this to the control terminal, and the control terminal may determine the node layout thereby.

In this manner, the layout of the nodes can be accurately detected by using an optical device, an acoustic device, or a different kind of measurement device, or, alternatively, a combination of these.

Embodiment 7

Although an embodiment of the present invention has been described in detail above, it is possible for the invention to take on the form of a system, apparatus, program or storage medium. More specifically, the present invention may be applied to a system comprising a plurality of devices or to an apparatus comprising a single device.

It should be noted that there are cases where the object of the invention is attained also by supplying a program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also fall within the technical scope of the present invention. In other words, the present invention also covers the computer program itself that is for the purpose of implementing the functions of the present invention.

In this case, so long as the system or apparatus has the functions of the program, the form of the program, for example, object code, a program executed by an interpreter or script data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or a compressed file that contains an automatic installation function can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user's computer. Further, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a memory provided in a function expansion board inserted into the computer or a function expansion unit connected to the computer, a CPU or the like mounted on the function expansion board or function expansion unit performs all or a part of the actual processing so that the functions of the foregoing embodiment can be implemented by this processing.

In this manner, according to the abovementioned embodiments, it is possible to provide a technique for reducing the occurrence of disconnections or interruptions when transmitting/receiving stream data that is temporally continuous, such as video or audio. It is furthermore possible to provide a technique for avoiding mutual interference even when simultaneously sending plural pieces of data to plural receiving terminals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-312132, filed Nov. 17, 2006, which is hereby incorporated by reference herein in its entirety.

What is claimed is:

1. A communication apparatus comprising:
    a receiving unit configured to receive data from a plurality of other communication apparatuses;
    a first maximum likelihood processing unit configured to perform maximum likelihood processing on data received by the receiving unit from the plurality of other communication apparatuses;
    a transmission unit configured to transmit the data on which the maximum likelihood processing has been performed by the first maximum likelihood processing unit to a plurality of other communication apparatuses,
    wherein the data received by the receiving unit includes data of each communication apparatus of the plurality of other communication apparatuses;
    a readout unit configured to read out data for the communication apparatus from among the data;
    a second maximum likelihood processing unit configured to perform maximum likelihood processing on a plurality of data read out by readout unit; and
    a decoding unit configured to decode the data on which the second maximum likelihood processing unit performs maximum likelihood processing.

2. The communication apparatus according to claim 1, wherein the receiving unit performs communication using Time Division Multiple Access, Code Division Multiple Access, Frequency Division Multiple Access, and/or Space Division Multiple Access techniques.

3. The communication apparatus according to claim 1, further comprising:
    a control unit configured, in response to a request from a control apparatus in a communication system to which the communication apparatus belongs, to generate information for estimating a distance to another communication apparatus based on communication with the another communication apparatus and to control transmission of the information to the control apparatus.

4. A communication apparatus comprising:
    a receiving unit configured to receive data in the course of a first communication slot, a second communication slot, and a third communication slot,
        wherein, in the course of the first communication slot, the receiving unit receives first data, which is directly transmitted from a first other communication apparatus to the communication apparatus,
        wherein, in the course of the second communication slot, the receiving unit receives second data, which is obtained by performing a relay transmission of the first data in a second other communication apparatus, and
        wherein, in the course of the third communication slot, the receiving unit receives third data from a third other communication apparatus, the third data being obtained by performing maximum likelihood processing based on the first data transmitted in the first communication slot and the second data transmitted in the second communication slot; and
    a first maximum likelihood processing unit configured to perform maximum likelihood processing based on the first data received in the course of the first communication slot, the second data received in the course of the second communication slot, and the third data received in the course of the third communication slot,
    wherein the data received by the receiving unit includes data of each communication apparatus of the other communication apparatuses, the communication apparatus further comprising:
    a readout unit configured to read out data for the communication apparatus from among the data;
    a second maximum likelihood processing unit configured to perform maximum likelihood processing on a plurality of data read out by the readout unit; and
    a decoding unit configured to decode the data on which the second maximum likelihood processing unit performs maximum likelihood processing.

5. A control method for a communication apparatus, the control method comprising:
- receiving data from a plurality of other communication apparatuses;
- performing first maximum likelihood processing on received data received from the plurality of other communication apparatuses;
- transmitting the data on which the first maximum likelihood processing has been performed to a plurality of other communication apparatuses, wherein the received data includes data of each communication apparatus of the plurality of other communication apparatuses;
- reading out data for the communication apparatus from among the data;
- performing second maximum likelihood processing on a plurality of read out data; and
- decoding the plurality of read out data on which the second maximum likelihood processing is performed.

6. A non-transitory computer-readable storage medium storing a program that, when executed by a computer, causes the computer to perform a control method comprising:
- receiving data from a plurality of other communication apparatuses;
- performing first maximum likelihood processing on received data received from the plurality of other communication apparatuses;
- transmitting the data on which the first maximum likelihood processing has been performed to a plurality of other communication apparatuses, wherein the received data includes data of each communication apparatus of the plurality of other communication apparatuses;
- reading out data for the communication apparatus from among the data
- performing second maximum likelihood processing on a plurality of read out data and
- decoding the plurality of read out data on which the second maximum likelihood processing is performed.

* * * * *